US010699213B2

(12) United States Patent
Fu et al.

(10) Patent No.: US 10,699,213 B2
(45) Date of Patent: Jun. 30, 2020

(54) SPACE EFFICIENT RANDOM DECISION FOREST MODELS IMPLEMENTATION UTILIZING AUTOMATA PROCESSORS

(71) Applicant: Micron Technology, Inc., Boise, ID (US)

(72) Inventors: Yao Fu, Castro Valley, CA (US); Paul Glendenning, Woodside, CA (US); Tommy Tracy, II, Charlottesville, VA (US); Eric Jonas, San Francisco, CA (US)

(73) Assignee: Micron Technology, Inc., Boise, ID (US)

( * ) Notice: Subject to any disclaimer, the term of this patent is extended or adjusted under 35 U.S.C. 154(b) by 859 days.

(21) Appl. No.: 15/214,188

(22) Filed: Jul. 19, 2016

(65) Prior Publication Data

US 2017/0255878 A1 Sep. 7, 2017

Related U.S. Application Data

(60) Provisional application No. 62/304,810, filed on Mar. 7, 2016.

(51) Int. Cl.
*G06N 20/00* (2019.01)
*G06N 5/00* (2006.01)

(52) U.S. Cl.
CPC ............. *G06N 20/00* (2019.01); *G06N 5/003* (2013.01)

(58) Field of Classification Search
CPC ................................ G06N 20/00; G06N 5/003
See application file for complete search history.

(56) References Cited

U.S. PATENT DOCUMENTS

| 7,831,526 | B1 * | 11/2010 | Crawford | .............. | G06F 16/904 |
| | | | | | 706/11 |
| 2014/0286527 | A1 * | 9/2014 | Harthattu | ........... | G06K 9/00228 |
| | | | | | 382/103 |
| 2014/0337269 | A1 * | 11/2014 | Eads | ...................... | G06N 20/00 |
| | | | | | 706/46 |

(Continued)

OTHER PUBLICATIONS

Roy et al., "Finding Motifs in Biological Sequences using the Micron Automata Processor," in 2014 IEEE 28th Intl. Parallel and Distributed Processing Symposium, pp. 416-424. (Year: 2014).*

(Continued)

*Primary Examiner* — Kamran Afshar
*Assistant Examiner* — Ryan C Vaughn
(74) *Attorney, Agent, or Firm* — Fletcher Yoder, P.C.

(57) ABSTRACT

An apparatus includes a processing resource configured to receive a feature vector of a data stream. The feature vector includes a set of feature values. The processing resource is further configured to calculate a set of feature labels based at least in part on the set of feature values to generate a label vector, provide the label vector to another processing resource, and to receive a plurality of classifications corresponding to each feature label of the label vector from the other processing resource. The plurality of classifications are generated based at least in part on a respective range of feature values of the set of feature values. The processing resource is configured to then combine the plurality of classifications to generate a final classification of the data stream.

29 Claims, 12 Drawing Sheets

(56) References Cited

U.S. PATENT DOCUMENTS

2015/0262064 A1* 9/2015 Burger ............... G06F 16/9027
706/46
2017/0103333 A1* 4/2017 Guo ...................... G06F 5/01

OTHER PUBLICATIONS

Tracy et al., "Towards Machine Learning on the Automata Processor," in Intl. Conf. High Performance Comp., Springer, Cham, 2016, pp. 200-218. (Year: 2016).*

Roy, "Algorithmic Techniques for the Micron Automata Processor," Ph.D. dissertation, Georgia Inst. Tech. (2015). (Year: 2015).*

Wang et al., "Fast Track Pattern Recognition in High Energy Physics Experiments with the Automata Processor," in arXiv preprint arXiv: 1602.08524 (2016). (Year: 2016).*

Bo et al., "Entity Resolution Acceleration using Micron's Automata Processor," in Proceedings of Architectures and Systems for Big Data, in Conjunction with ISCA (2015). (Year: 2015).*

Sabotta, "Advantages and Challenges of Programming the Micron Automata Processor," Iowa State University thesis (2013). (Year: 2013).*

Wang et al., "Association Rule Mining with the Micron Automata Processor," in 2015 IEEE 29th Intl. Parallel and Distributed Processing Symposium 689-699 (2013). (Year: 2013).*

Zhou et al., "Brill Tagging on the Micron Automata Processor," in Proceedings of the 2015 IEEE 9th Intl. Conf. on Semantic Computing 236-239 (2015). (Year: 2015).*

Paul Dlugosch et al; An Efficient and Scalable Semiconductor Architecture for Parallel Automata Processing; IEEE 2014; pp. 1-11; vol. 25; IEEE Transaction on Parallel and Distributed Systems.

Paul Dlugosch et al; Supplementary Material for an Efficient and Scalable Semiconductor Architecture for Parallel Automata Processing; IEEE 2013; pp. 1-5; IEEE Transaction on Parallel and Distributed Systems.

Paul Dlugosch, The Automata Processor-Practical Processing in Memory, how to article, May 27, 2014.

U.S. Appl. No. 15/166,462, filed May 27, 2016, Yao Fu.

* cited by examiner

SPACE EFFICIENT RANDOM DECISION FOREST MODELS IMPLEMENTATION UTILIZING AUTOMATA PROCESSORS

CROSS-REFERENCE TO RELATED APPLICATION

This application is a Non-Provisional Patent Applications of U.S. Provisional Patent Application No. 62/304,810, entitled "Space Efficient Random Forests Implementation Utilizing Automata Processors," filed Mar. 7, 2016, which is herein incorporated by reference in its entirety and for all purposes.

BACKGROUND

Field of Invention

Embodiments of the invention relate generally to automata processors, and more specifically, to implementing RANDOM FORESTS®, or random decision forest models, utilizing automata processors.

Description of Related Art

Certain apparatus, including computational electronic devices and systems, may include a number of processing resources (e.g., one or more processors), which may retrieve and execute instructions and store the results of the executed instructions to a suitable location. For example, the processing resources may include a number of functional units, arithmetic units, and similar circuitry to execute instructions by performing a number of Boolean logical operations and arithmetic functions. One particular processing resource may include an automata-based processing resource, which may be suitable for use in applications such as, for example, network security, computational biology, image processing, text searching, and so forth. These automata-based processing resources, may include, or may be described for example, by a number of state elements and signal transitions among these state elements. Each state element of the automata-based processing resources may store and/or recognize one or more data values.

Similarly, a variety of applications employ ensemble learning models utilizing, for example, a collection of decision trees (e.g., RANDOM FORESTS®, or random decision forest models) to quickly and accurately classify an input based on a vector of features. The execution of these models on existing Von Neumann processor architectures may be memory-bound, and further architecture-conscious optimizations to accelerate by coercing these computations into complex memory hierarchies have only achieved limited success. It may be useful to provide devices and methods to increase processing and performance efficiency of computing machine learning models such as RANDOM FORESTS®, or random decision forest model.

DETAILED DESCRIPTION

Figure 1:
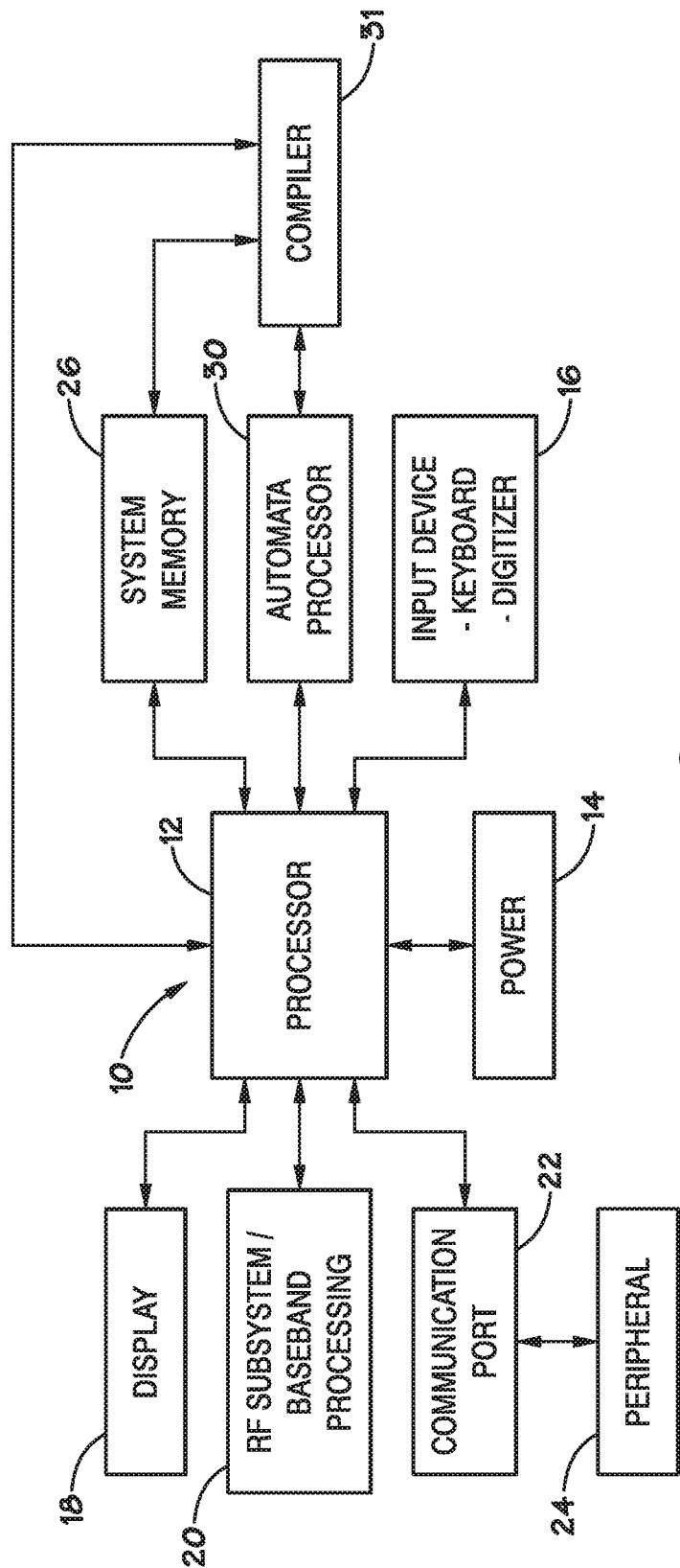
FIG. 1 illustrates a block diagram of a system including an automata processor, in accordance with an embodiment.

Present embodiments relate to implementing and computing RANDOM FORESTS® models, or random decision forest models, utilizing state transition elements (STEs) of, for example, an automaton or automata processor. Indeed, in certain embodiments, the automata processor may translate tree-based ensemble models (e.g. RANDOM FORESTS®, or random decision forest model) from a tree-traversal algorithm memory-bound by decision tree depth to a pipelined design that computes thresholds independently from model computation. For example, the processor or the automata processor may implement and compute RANDOM FORESTS® models, or random decision forest models, by converting each of the path-to-leaves of decision trees into feature identification chains based on, for example, feature values, and, more specifically, a range of feature values. In certain embodiments, in lieu of utilizing floating point numbers and/or floating point operations to represent feature values, a processor may perform a labeling technique to represent floating point values to utilizing symbol-set and operations available on the automata processor. In some embodiments, each STE or automaton of the automata processor may be designed to process feature values in the same order. Yet still, in order to allow all of the automata and/or STEs required for large RANDOM FORESTS® models, or random decision forest models, onto a limited number of automata processors, the present embodiments may include a compression technique, which collapses multiple edge-transitions of a chain to be processed by a single STE of the automata processor to achieve space-efficiency.

It should be appreciated that as used herein, "row" may refer to at least one axis of an array of cells (e.g., memory cells). Similarly, "column" may refer to at least one other axis of the array of cells (e.g., memory cells) that may intersect and/or extend in a direction perpendicular to the row axis. Indeed, the "rows" and the "columns" may be respectively understood to refer to any one of at least two axes, in which the two axes are substantially perpendicular. In other words, the "rows" may or may not necessarily be horizontal, and the "columns" may or may not necessarily be vertical, and vice-versa. Furthermore, an "automata processor" or "automaton processor" may refer to any programmable or otherwise configurable device that may be utilized to perform high efficiency data searches, analyses, processing of complex structured and unstructured data patterns, processing of simple data and complex data models, and so forth, often as part of a parallel process.

Lastly, while the present techniques may be described in a manner in which some specific functions are discussed as being performed by, for example, a general-purpose processor (e.g., processor 12) and while other specific functions are discussed as being performed by, for example, one or more automata processors (e.g., automata processor(s) 30), it should be appreciated that, in some embodiments, each of the present techniques may be performed solely by a general-purpose processor (e.g., processor 12), solely by one or more automata processors (e.g., automata processor(s) 30), or in conjunction between a general-purpose processor (e.g., processor 12) and one or more automata processors (e.g., automata processor(s) 30).

With the foregoing in mind, it may be useful to describe an embodiment of a processor-based system, such as the processor-based system 10 illustrated in FIG. 1. The processor-based system 10 may include any of various electronic devices such as, for example, computers, tablet computers, pagers, mobile phones, personal organizers, portable audio players, cameras, watches, industrial measurement electronic devices, and so forth. As illustrated, the processor-based system 10 may include a processor 12. The processor 12 (e.g., microprocessor) may be provided to control the processing of system functions and requests in the system 10. Further, the processor 12 may include a number of processors that share system control. Indeed, as used herein, the processor 12 may be referred to as a "processing resource," and should be understood to include any of various processor architectures (e.g., electronic microprocessor architectures) that may be utilized to process and analyze large numbers of data streams and instructions serially and/or in parallel. For example, in some embodiments, the processor 12 may include a central processing unit (CPU) architecture, a field programmable gate array (FPGA) processor architecture, a system on chip (SoC) processor architecture, digital signal processor (DSP) processor architecture, a general-purpose macro processor architecture, or any of various programmable processor architectures.

The processor-based system 10 may also include a power supply 14. For example, if the processor-based system 10 may be a portable system, the power supply 14 may include permanent batteries, replaceable batteries, and/or rechargeable batteries. The power supply 14 may also include an alternating current (AC) adapter, such that the processor-based system 10 may receive power from, for example, a wall outlet or other AC power source. The power supply 14 may also include a direct current (DC) adapter such that the processor-based system 10 may receive power from, for example, a DC power source.

Various other devices may be coupled to the processor 12 depending on the functions that the processor-based system 10 performs. For example, in certain embodiments, an input device 16 may be coupled to the processor 12. The input device 16 may include, for example, buttons, switches, a keyboard, a light pen, a stylus, a mouse, and/or a voice recognition system. The system 10 may also include a display 18, which may be coupled to the processor 12. The display 18 may include a liquid crystal display (LCD), a cathode ray tube (CRT), organic light emitting diode displays (OLEDs), and/or various other display technologies.

Furthermore, the system 10 may include a RF sub-system/baseband processing circuitry 20 that may be coupled to the processor 12. In one embodiment, the RF sub-system/baseband processing circuitry 20 may include one or more transceivers that may be useful in allowing the system 10 to communicate wirelessly. A communications port 22 may also be coupled to the processor 12. The communications port 22 may be adapted to be coupled to one or more peripheral devices 24 such as, for example, a modem, a printer, a computer, or to a network, such as a local area network, remote area network, intranet, or the Internet.

In certain embodiments, such as where the processor 12 may be used to control the functioning of the processor-based system 10 by executing instructions, a system memory 26 may be used to allow the processor 12 to efficiently carry out its functionality. As depicted, the system memory 26 may be coupled to the processor 12 to store and facilitate execution of various instructions. The system memory 26 may include volatile memory such as, for example, random access memory (RAM), dynamic random access memory (DRAM), static random access memory (SRAM), synchronous dynamic random access memory (SDRAM), and/or thyristor random access memory (TRAM). The system memory 26 may also include non-volatile memory such as, for example, read-only memory (ROM), EEPROM, NAND flash memory, NOR flash memory, phase change random access memory (PCRAM), resistive random access memory (RRAM), magnetoresistive random access memory (MRAM), and/or spin torque transfer random access memory (STT RAM).

In certain embodiments, the system 10 may also include one or more automata processors 30 that may be used to internally process instructions stored (e.g., written) to the system memory 26 (although discussed in the context of this embodiment as being used in the system memory 26). Indeed, as used herein, the automata processor(s) 30 may be referred to as an "another processing resource," and should be understood to include any programmable or otherwise configurable device that may be utilized to perform high efficiency data searches, analyses, processing of complex structured and unstructured data patterns, processing of simple data and complex data models, and so forth, often as part of a parallel process.

For example, as will be further appreciated, the automata processor(s) 30 may include various functional components, which may be referred to hereinafter as "elements" or "state transition elements (STE)" that may, in some embodiments, be woven into the hierarchy of programmable routing matrices of the automata processor(s) 30 and may be used store and process structured and unstructured data patterns. As further illustrated, the system 10 may include a compiler 31 communicatively coupled to the automata processor(s) 30. For example, in one embodiment, the compiler 31 may be used to program the automata processor(s) 30.

Figure 2:
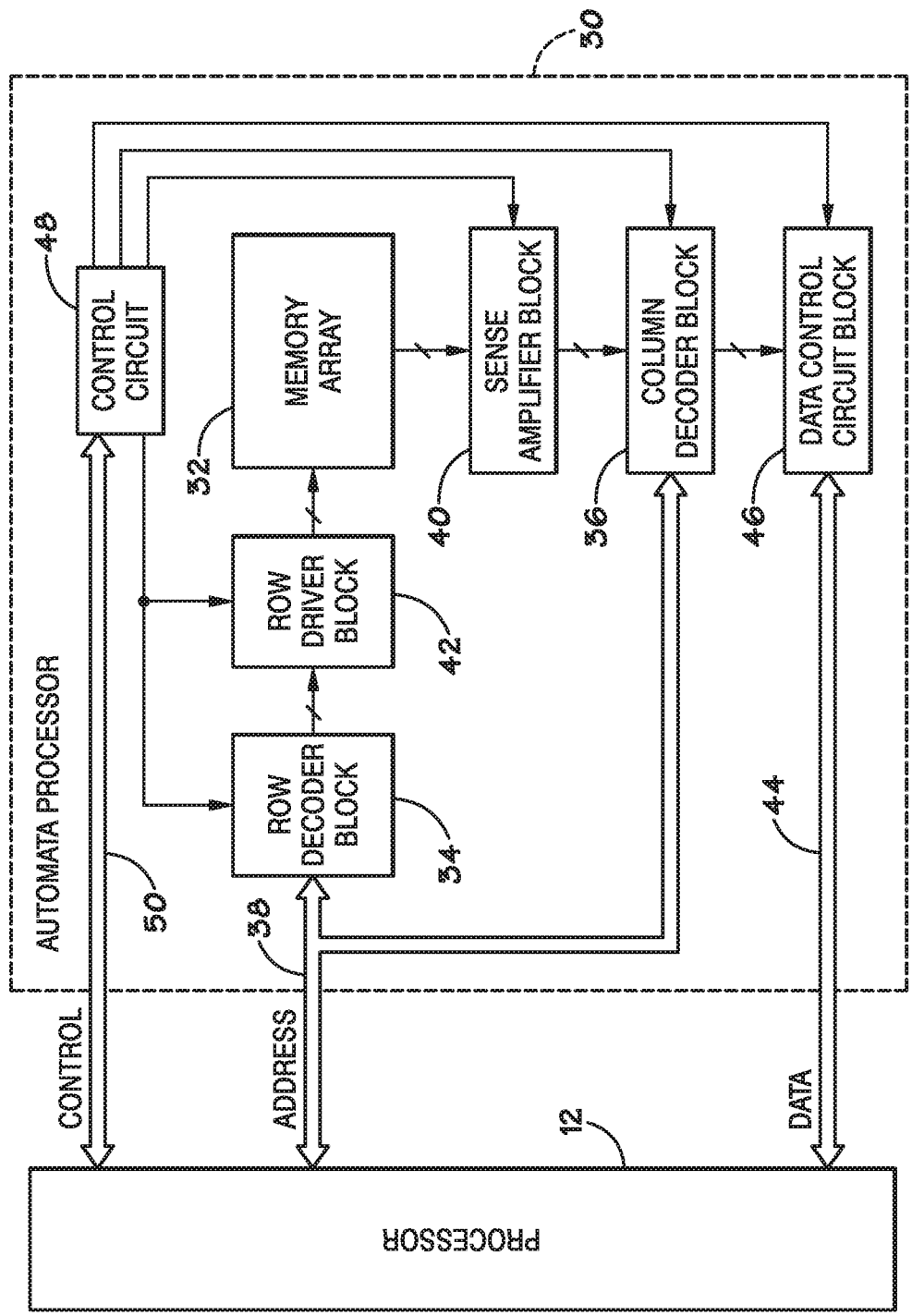
FIG. 2 illustrates a block diagram of the automata processor of FIG. 1, in accordance with an embodiment.

Turning now to FIG. 2, a block diagram of one embodiment of the automata processor(s) 30 of FIG. 1 is illustrated. As illustrated, in one embodiment, the automata processor(s) 30 may include a memory array 32. As will be further appreciated, the memory array 32 may include an array of rows (e.g., thousands of rows) and columns (e.g., hundreds of columns) of memory cells that are accessible and sensible by a number of access lines and data lines. The access lines are often referred to as "wordlines" (WL). The data lines are often referred to as "bit lines" (BL) or "digit lines" (DL). The size of the memory array 32 (e.g., the number of memory cells, rows, columns, wordlines and bit/digit lines) may vary between different devices.

As further illustrated, to access the memory array 32, a row decoder block 34 and a column decoder block 36 may be provided to receive and translate address information from the processor 12 via the address bus 38 to access a particular row of memory cells in the memory array 32. A sensing circuit, such as the sense amplifier block 40 including a number of the sense amplifiers, may be also provided between the column decoder 36 and the memory array 32 to sense individual data values stored in the memory cells of the memory array 32. Further, a row driver block 42 may be provided between the row decoder block 34 and the memory array 32 to activate a selected wordline in the memory array according to a given row address.

In certain embodiments, during read and program operations, such as a write operation, data may be transferred to and from the automata processor(s) 30 via the data bus 44. The coordination of the data and address information may be conducted through a data control circuit block 46. As further depicted, the automata processor(s) 30 may include control circuitry 48 that may be used to receive control signals from the processor 12 via the control bus 50. The control circuitry 48 may be coupled (e.g., communicatively coupled) to each of the row decoder block 34, the column decoder block 36, the sense amplifier block 40, the row driver block 42, and the data control circuit block 46, and may be used to coordinate timing and control among the various circuits included in the automata processor(s) 30.

The control circuitry 48 may decode signals provided by control bus 50 from the processor 12. In certain embodiments, these signals may include chip activate signals, write activate signals, and address latch signals that may be used to control operations performed via the memory array 32 such as, for example, data read, data write, and data erase operations. The control circuitry 48 may be responsible for executing instructions from the processor 12.

Figure 3:
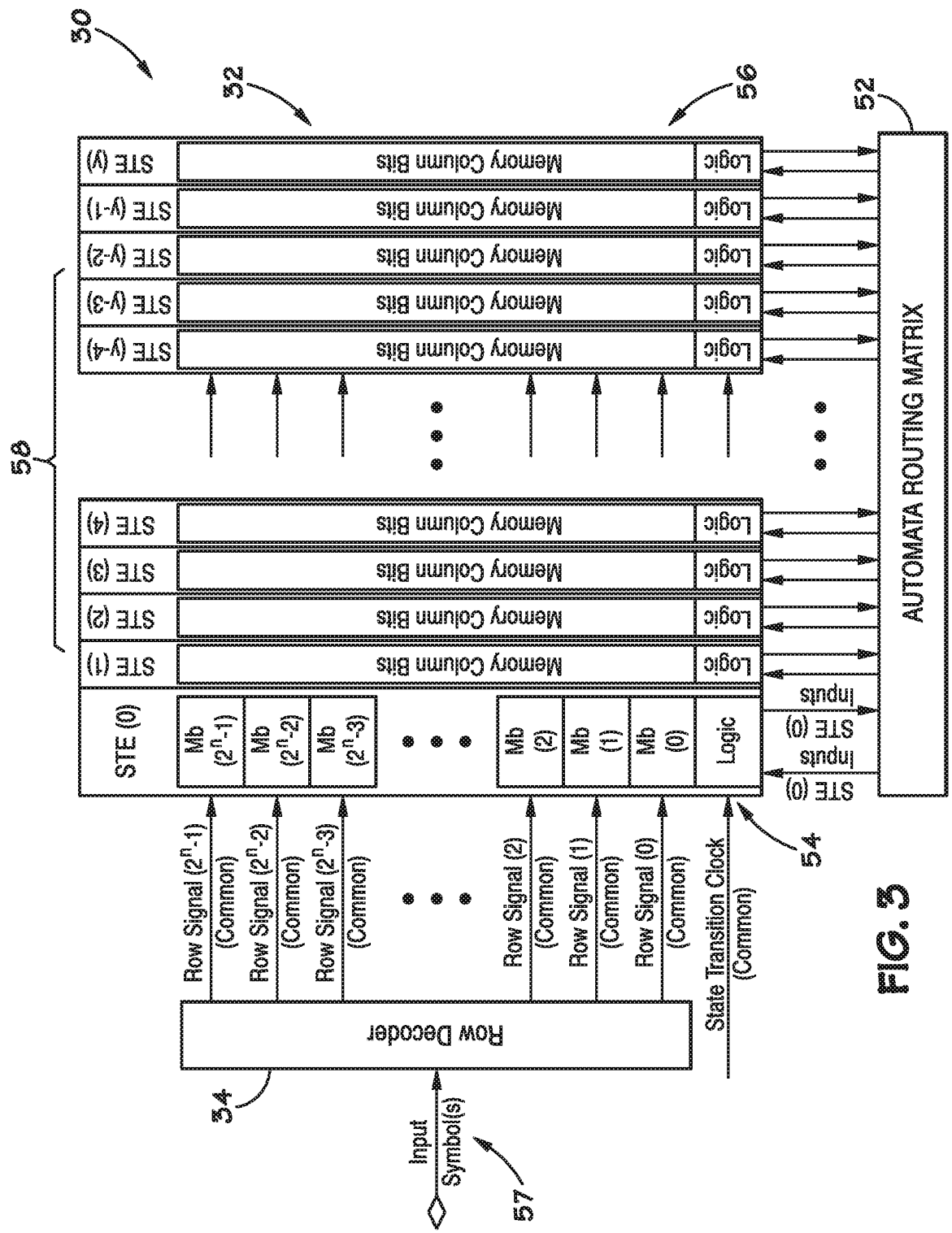
FIG. 3 illustrates a block diagram of an automata processor including a memory array and a routing matrix structure, in accordance with an embodiment.

In certain embodiments, the sense amplifier block 40 may include a number of sense amplifiers and a number of processing structures, which may include accumulator circuitry and may be used to perform Boolean logical operations and arithmetic functions. For example, the automata processor(s) 30 may include arithmetic logic unit (ALU) circuitry, floating point unit (FPU) circuitry, and/or a combinational logic blocks that may be used to execute instructions by performing arithmetic functions such as, for example, addition, subtraction, multiplication, and division, as well as Boolean logical operations such as, for example, AND, OR, NOT, NAND, NOR, and XOR, sum-of-products (SoP), and products-of-sums (PoS) Boolean logical operations on data (e.g., one or more operands). In some embodiments, as will be further appreciated, the automata processor(s) 30 may utilize the ALU circuitry, FPU circuitry, and/or combinational logic blocks in the execution and computation of RANDOM FORESTS® models, or random decision forest models. As illustrated by FIG. 3, the automata processor(s) 30 may include a routing matrix structure 52 that may be communicatively coupled to a state transition element (STE) memory array 58 (e.g., logic blocks 54 and columns 56 of memory cells).

In certain embodiments, as further illustrated in FIG. 3, the row decoder 34 may receive one or more input symbols 57 (e.g., 8-bit symbols, 16-bit symbols, 32-bit symbols, 64-bit symbols, and so on). The row decoder 34 may then decode the one or more input symbols 57 (e.g., address signals) and provide one or more input symbols 57 (e.g., data streams) to the respective columns 56 of the memory array 32.

In certain embodiments, as further illustrated in FIG. 3, the automata processor(s) 30 may be used to perform automata operations through the routing matrix structure 52 that may be included as part of the automata processor(s) 30. For example, in one embodiment, each automata processor(s) 30 and all the routing matrix structure 52 paths of the automata processor(s) 30 may operate in parallel (e.g., operating on the same input symbols 57 concurrently). Thus, the routing matrix structure 52 of the automata processor(s) 30 may provide interconnections at the various levels of a hierarchy within rows of memory cells, columns 56 of memory cells, or functional blocks.

Figure 4:
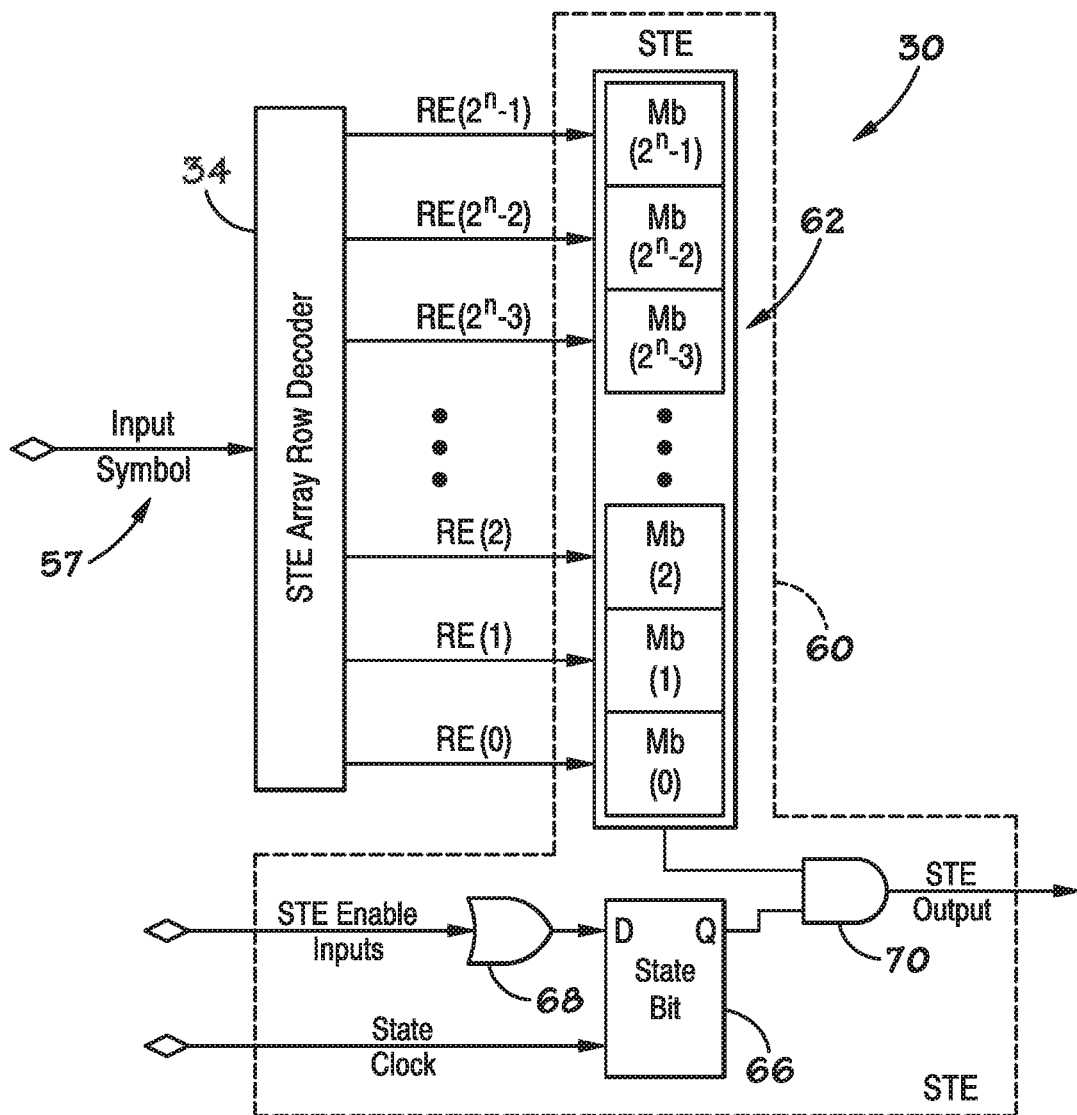
FIG. 4 illustrates a block diagram of state transition elements (STEs) that may be included as part of the automata processing structure, in accordance with an embodiment.

In certain embodiments, the automata processor(s) 30 may include various "state transition elements" or STEs that may, in some embodiments, be woven into the hierarchy of the routing matrices 52 of the automata processor(s) 30. For example, FIG. 4 depicts a state transition element (STE) memory array 58, which may include an example STE 60. The STE 60 may include a current-state memory column 62 (e.g., column of memory cells) and the next-state decoder (e.g., logic 54). It should be appreciated that while FIG. 4 illustrates a single STE 60, in certain embodiments, the automata processor(s) 30 may include an array of STEs 60 that may be implemented as a memory array with control and computational logic.

For example, each column 62 of the memory array 32 may include logic 54 that contains a single state bit (e.g., that may be pre-stored) as illustrated by the flip-flop (FF) 66, enable inputs that may be input into a logical OR gate 68, and an output decoder and driver via logical AND gate 70. As depicted, the output may be generated based on the logical AND of the state bit output via the FF 66 and the output of the associated column of memory of cells 62. In one embodiment, each state bit may include a logical value of "1" or reset logical value "0" based on whether that STE 60 is in an active or inactive state.

Figure 5:
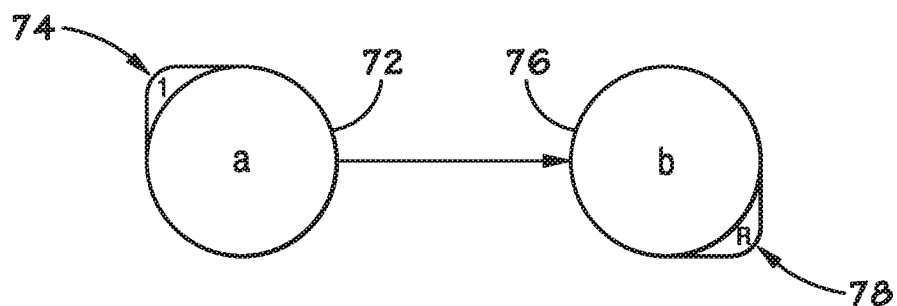
FIGS. 5-8 illustrate block diagrams of STEs and examples of identifying sequential data patterns, in accordance with an embodiment.

FIG. 5 illustrates an Automata Network Markup Language (ANML) (e.g., eXtensible Markup Language [XML] that may be used to describe an automata network) example of the operation of an STE 72 (e.g., start-state STE) and an STE 76 (e.g., next-state STE). The STE 72 may be start-enabled and include a start-state symbol 74 as indicated by the value "1" located in the upper left corner of the STE 74. The STE 72 may receive bytes of input data (e.g., input symbols 57), and report when a match of the input data (e.g., input symbols 57) is detected as indicated by the report symbol 78 located in the lower right corner of the next-state STE 76.

Figure 6:
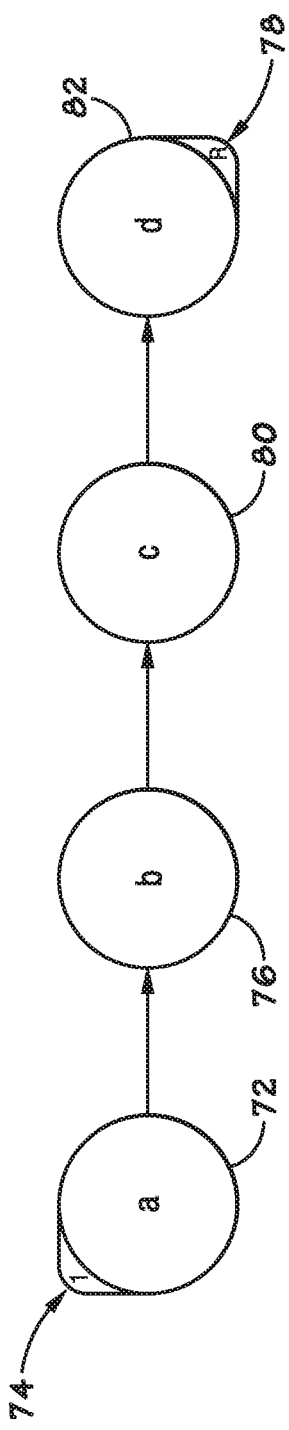

As a further example of the operations that may be performed by the STEs (e.g., STEs 72, 76) of the automata processor(s) 30, for example, a sequential symbol pattern identification problem may be solved via the STEs (e.g., STEs 72, 76, 80, 82) as illustrated in FIG. 6. For example, given a data pattern including characters "abcd," the STEs 72, 76, 80, 82 may be used to identify any input data pattern (e.g., input symbols 57) starting with the characters "abcd." For example, as depicted in FIG. 6, the STE 72 may recognize a symbol "a," and may then be activated at the start of the input data pattern (e.g., input symbols 57) as indicated by the start-state symbol 74 (e.g., the value "1" located in the upper left corner of the STE 74).

Thus, when the input data pattern starts with an "a," the STE 72 will be matched and activate the STE 76 (e.g., next-state STE). The activated STE 76 may be then allowed to recognize a symbol "b" of the input data pattern. If the symbol "b" follows the first symbol "a," the STE 76 may be matched, and may then activate STE 80 (e.g., next-state STE). The STE 80 may then recognize symbol "c." It then follows that if "c" is the next input symbol of the input data pattern, the STE 80 will be matched, and may subsequently activate the STE 82. Lastly, if the next input symbol of the input data pattern is "d," the reporting STE 82 will be matched and report that the pattern has been identified (e.g., indicated by the report symbol 78 located in the lower right corner of the STE 76). However, if there is any position (e.g., "a," "b," "c," "d") of the input data pattern that does not match its corresponding STE (e.g., STE 72 corresponding to "a," STE 76 corresponding to "b," STE 80 corresponding to "c," STE 82 corresponding to "d,"), the reporting STE 82 will not report a match.

In certain embodiments, it may be useful to utilize the STEs (e.g., STEs 72, 76, 80, 82), and, more generally, the automata processor(s) 30 with a number of encoding techniques and automata processing embodiments to improve utilization of transition pattern symbol memory (e.g., state transition element (STE) memory array 58 of the automata processor(s) 30) and reduce the array size of STEs when searching or identifying data patterns. Indeed, as will be further described through various examples below, in certain embodiments, the processor 12 may encode sequential position information together with data pattern symbols to generate a position encoded pattern by which to compare data patterns and identify searchable data patterns programmed on the automata processor(s) 30 within stored or input data patterns. Such techniques may contribute to a reduction in the number of STEs utilized to, for example, compute RANDOM FORESTS® models, or random decision forest models, on the automata processor(s) 30. As the position encoded patterns and data symbols include position information, the states and transitions representing position information to identify sequential data patterns may be merged into a single or relatively low number of states and transitions with respect to each STE of the automata processor(s) 30.

Exact sequential data symbol pattern identification may allow the automata processor(s) 30 to identify each data symbol of an input data pattern with that of a stored sequential data pattern in the exact sequential order of the stored sequential data pattern without allowing for any mismatch errors, substitution errors, deletion errors, or insertion errors. For example, given a data pattern "abcd," the objective is to be able to identify any input data pattern starting with "abcd," in which the STE 72 may recognize the data symbol "a," and may be activated at the start of data pattern inputting. When an input data pattern starts with the data symbol "a," the STE 72 will be matched and activate STE 76. An activated STE 76 may be then able to recognize data symbol "b." Then, if data symbol "b" is following the first data symbol "a," the STE 76 will be matched and activate the STE 80. The STE 80 may recognize data symbol "c." If the data symbol "c" is the next input data symbol, the STE 80 will be matched and activate the STE 82. Lastly, if the next input symbol is exactly the data symbol "d," the reporting STE 82 will be matched and report that the data pattern has been identified within the input data pattern. If there is any position of the input pattern that does not match its corresponding STE, the automata processor(s) 30 will not report a match.

As an illustrative example, given a sequential symbol data pattern S="s1s2 . . . sL" with length L, and for any i where $1 \leq i \leq L$, s(i) is a symbol in alphabet with alphabet size A. The processor 12 may convert data pattern S into position encoded data pattern P="p1p2 . . . pL" by first defining a data symbol value for each data symbol in alphabet A (e.g., assign each symbol s(i) in the alphabet a unique value vi from 0 to A−1). The processor 12 may then generate a position encoded code p(i) for each s(i). The position encoded code p(i) may be calculated as: $p(i)=v(i)+(i-1)*A$, where v(i) is the symbol value for a given symbol s(i). Thus, the encoded data pattern may be data pattern of position encoded code "p1p2 . . . pL."

Using the same example data pattern "abcd," the alphabet of this example may include k (e.g., 4) possible symbols (e.g., {a, b, c, d}). The automata processor(s) 30 may define symbol values as: a=0, b=1, c=2, d=3. The generated position encoded code may be calculated as: Position 1 ("a"), p1=0+(1−1)*4=0, Position 2 ("b"), p2=1+(2−1)*4=5, Position 3 ("c"), p3=2+(3−1)*4=10, Position 4 ("d"), p4=3+(4−1)*4=15. Thus, the position encoded data pattern may be described as: P=(0)(5)(10)(15).

Figure 7:
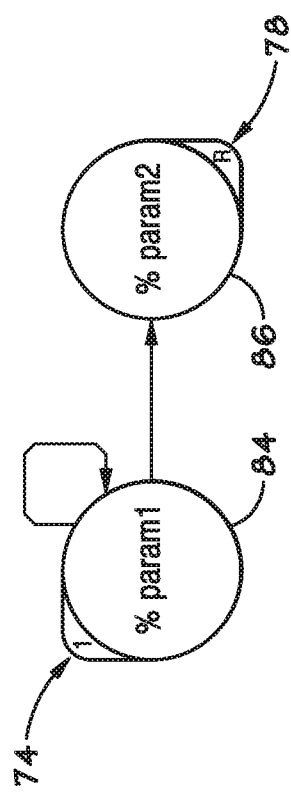

In certain embodiments, the aforementioned data pattern "abcd" example as discussed above with respect to FIG. 6, may be performed utilizing the STEs 84 and 86 as illustrated in FIG. 7. For example, as depicted, the STE 84 (e.g., "%param1") may be set to recognize the position encoded symbols (0), (5), and (10). Similarly, STE 86 (e.g., "%param2"), for example, may be set to recognize symbol "(15)." Thus, when the position encoded data pattern "(0)(5)(10)(15)" representing "abcd" is input into the STE 84 (e.g., start-state STE), the first "(0)" will match the data of the STE 84, and thus the STE 84 and the STE 86 may be activated. The second symbol "(5)" may still match the STE 84, but not the STE 86. In such a case, the STE 84 and the STE 86 may each still be activated.

Similarly, the third input symbol "(10)" may also keep the STE 84 and the STE 86 activated, as the data of the STE 84 is matched, but STE 86 not matched. The last symbol "(15)" in the position encoded data pattern may match only the STE 86, and may thus report the identification of this pattern (e.g., as indicated by the report symbol 78 located in the lower right corner of the next-state STE 86). As may be appreciated, any position mismatch may result in a break at the corresponding STE, and thus the automata processor(s) 30 will not report a match.

In some embodiments, as may be appreciated, the above techniques may assume an ideal case, in which the number of different data symbols an STE can recognize may not be limited. In some embodiments, for example, as will be further appreciated, the maximum pattern length recognizable may be bounded by 1 plus the data symbol capacity of an STE C divided by the alphabet size A ($L \leq (1+(C/A))$). Thus, in such a case in which there is a limit for the number of different data symbols an STE may recognize, the following encoding technique may be utilized (which will be discussed in further detail below with respect to FIG. 14).

For example, the processor 12 may begin by defining a data symbol value for each symbol in alphabet A (e.g., assign each symbol s(i) in the alphabet A a unique value vi from 0 to A−1). The automata processor(s) 30 and/or the processor 12 may then determine the position value increase period T to be the smallest integer not less than L*A/C (T=CEIL(L*A/C)1), for example, where L is the data pattern length, A is the alphabet of the data pattern, and C is the data symbol capacity of an STE C. In this example, the automata processor(s) 30 and/or the processor 12 may define q(i) as the smallest integer not less than i/T, (q(i)=CEIL(i/T)). Thus, the position encoded code p(i) for each s(i) is calculated as: p(i)=vi+(q(i)−1)*A, and the encoded data pattern may be a data pattern of position encoded code "p1p2 . . . pL."

As an example of the aforementioned method, the following illustration identifies an exact pattern of "abcdbd," with the limitation that the maximum number of different symbols an STE can recognize is 8. The alphabet A is {a, b, c, d} with its size at 4:
1. Define symbol value:
a=0, b=1, c=2, d=3;
2. t=CEIL(6*4/8)=3;
3. q1=CEIL(1/3)=1;
q2=CEIL(2/3)=1;
q3=CEIL(3/3)=1;
q4=CEIL(4/3)=2;
q5=CEIL(5/3)=2;
q6=CEIL(6/3)=2.
4. Position encoded code:
   Position 1 ("a"), p1=0+(1−1)*4=0;
   Position 2 ("b"), p2=1+(1−1)*4=1;
   Position 3 ("c"), p3=2+(1−1)*4=2;
   Position 4 ("d"), p4=3+(2−1)*4=7;
   Position 5 ("b"), p5=1+(2−1)*4=5;
   Position 6 ("d"), p6=3+(2−1)*4=7;
5. Position encoded data pattern P=(0)(1)(2)(7)(5)(7).

Figure 8:
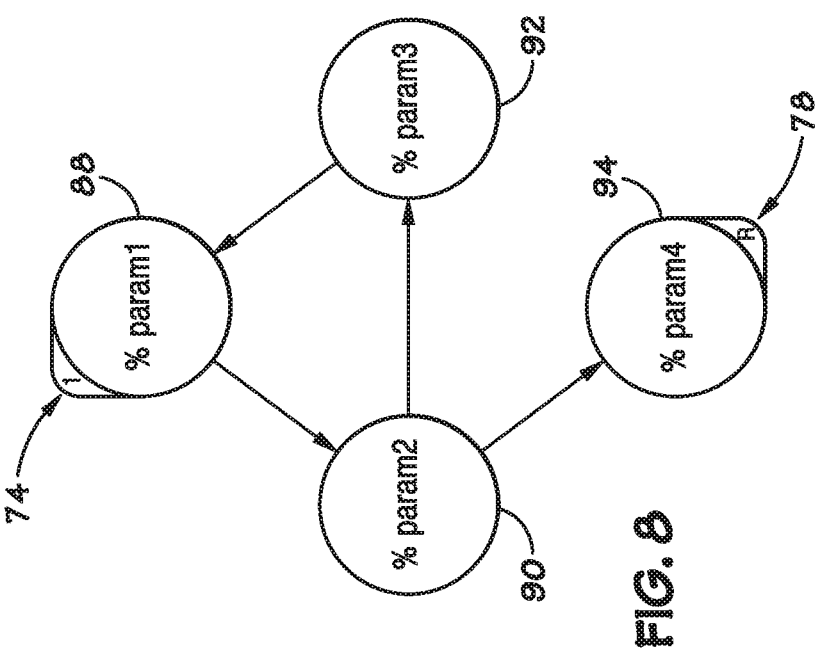

For example, based on the above method and encoding techniques, as will be further appreciated, the array of STEs (e.g., STEs 72, 76, 80, and 82) of the automata processor(s) 30 may be reduced into (L*A/C)+1 STEs (e.g. STEs 84 and 86) as illustrated with respect to FIG. 7. Furthermore, in certain embodiments, utilizing the present embodiments, the aforementioned data pattern "abcdbd" example as discussed above may be performed utilizing the STEs 88, 90, 92, and 94 as illustrated in FIG. 8. In the STE 88 (e.g., "%param1" or a next-state STE) may be set, for example, to recognize position encoded data symbols (0) and (7) of the position encoded pattern (e.g., P=(0)(1)(2)(7)(5)(7)). The STE 90 (e.g., "%param2") may be set, for example, to recognize position encoded data symbols (1) and (5) of the position encoded pattern (e.g., P=(0)(1)(2)(7)(5)(7)). The STE 92 (e.g., "%param3") may be set, for example, to recognize position encoded data symbol (2). Similarly, the STE 94 (e.g., "%param4" or the reporting STE) may be set, for example, to recognize position encoded data symbol (7). While the extended position encoded pattern (e.g., P=(0)(1)(2)(7)(5)(7)) representing "abcdbd" may be input, the first "(0)" may match the STE 88 and activate the STE 90. The second position encoded data symbol "(1)" may match the STE 90, and activate the STE 92 and the STE 94.

In certain embodiments, the third symbol "(2)" may match the STE 92, but the third symbol "(2)" may not match the STE 94. Thus, the STE 88 may be activated again. The next position encoded data symbol "(7)" may match the STE 88, and then activate the STE 90. The next position encoded data symbol "(5)" may match the STE 90 and activate both STE 92 and STE 94 again. Finally, the last position encoded data symbol "(7)" in the position encoded pattern (e.g., P=(0)(1)(2)(7)(5)(7)) may match only the STE 94, and subsequently report the identification of this data pattern "abcdbd." As will be further appreciated with respect to FIGS. 9-15, in some embodiments, it may be useful to utilize the processor 12 in conjunction with the automata processor(s) 30, and more specifically, the STEs of the automata processor(s) 30 to compute space-efficient and process-efficient RANDOM FORESTS® models, or random decision forest models.

Figure 9:
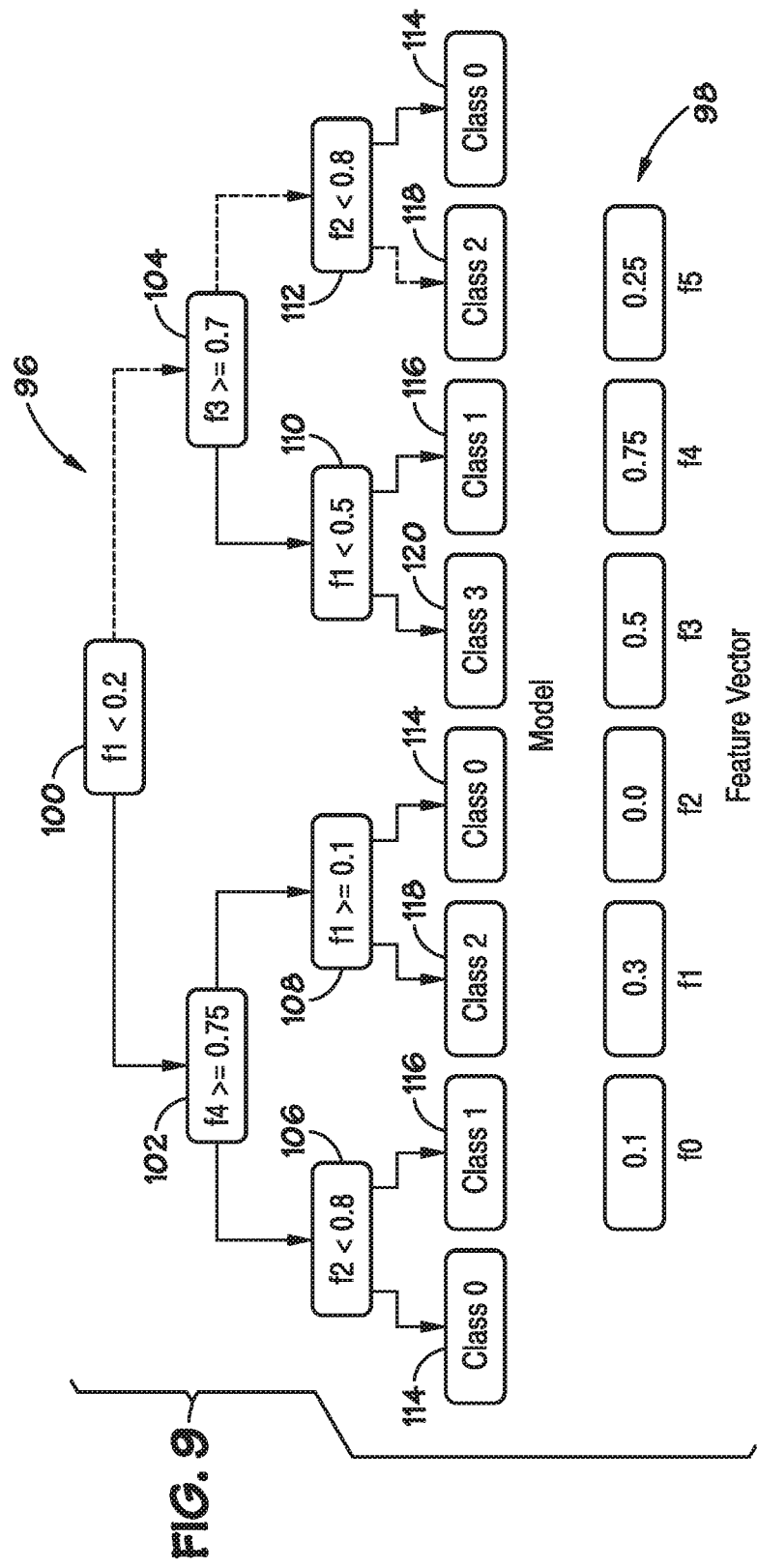
FIG. 9 illustrates a block diagram of a three-stage execution pipeline used to classify input data for computing RANDOM FORESTS®, or random decision forest models, in accordance with an embodiment.

In certain embodiments, the processor 12 and the automata processor(s) 30 may, in some embodiments, operate in conjunction or alone to generate and compute RANDOM FORESTS® models, or random decision forest models, composed of, for example, a number of binary decision trees. An example decision tree 96 and feature vector 98 are illustrated in FIG. 9. As illustrated, the decision tree 96 may include a number of nodes 100, 102, 106, 108, 110, and 112 and classification nodes 114, 116, 118, and 120 (e.g., leaves of decision tree). In one embodiment, the processor 12 may generate the decision tree 96 by iteratively selecting a split feature from a random subset of the feature space (e.g., feature vector 98), and determining the best threshold split value to maximize the entropy reduction per split (e.g., find a threshold of that feature that can best separate the classes of the training samples). For example, in one embodiment, if there are a total of 40 features in a classification example, one decision tree of the RANDOM FORESTS®, or random decision forest model, may use a random subset of 30 features to construct the decision tree model. Similarly, other decision trees may use other random subsets of 30 features to construct other decision trees in the RANDOM FORESTS®, or random decision forest model.

The processor 12 may capture this threshold check for the split feature as a split node in the decision tree 96, in which each left node (e.g., child nodes 102, 106, and 110) may correspond to the next-state if the threshold qualification is met. Similarly, each right node (e.g., child nodes 104, 108, and 112) may correspond to the previous state if the threshold qualification is not met. The automata processor(s) 30 may continue this learning process until a maximum depth or minimum error threshold is met. As it may be appreciated, each classification node 114, 116, 118, and 120 (e.g., leaves of decision tree), in the decision tree 96 may represent a classification result. In some embodiments, the decision tree 96 may thus be used to classify input data into one of four classification nodes 114 (e.g., "Class 0"), 116 (e.g., "Class 1"), 118 (e.g., "Class 2"), and 120 (e.g., "Class 1") based on the values of features f1, f2, f3, and f4.

For example, an automata processor 30 may calculate a classification of the input data (e.g., feature vector 98) utilizing the decision tree 96. It should be appreciated that the decision tree 96 is included merely for the purpose of illustration. In certain embodiments, the decision tree 96 may include one of a number of decision trees (e.g., decision tree(d) 96) of a RANDOM FORESTS® model, or random decision forest model. Starting at the root node 100, the automata processor 30 may traverse a root-to-leaf path based on the values of the features of the input data. Because each of the split operations may be mutually exclusive, there is only one root-to-leaf path in the decision tree 96 which may be traversed for any input feature-vector 98. For example, a root-to-leaf path (e.g., illustrated by the dashed line) is traversed in the decision tree 96 from root node 100 to node 104 to node 112, and finally classified as classification node 118 (e.g., "Class 2"). The automata processor 30 may thus classify the input feature-vector 98 as belonging to "Class 2" by utilizing the decision tree 96. In some embodiments, the net classification of a RANDOM FORESTS® model, or random decision forest model, may be the mode (e.g., the value or the classification that occurs most often) of the results from each individual decision tree (e.g., decision tree(s) 96).

As may be appreciated, many machine-learning algorithms such as for example, RANDOM FORESTS® or random decision forest models, may be trained offline and then optimized for fast run-time classification of input data. However, certain implementations may run as a function of decision tree 96 depth. This may lead to non-linearity in certain computations, which may arise from poor locality of memory access as the computation at each node may require access to both the feature-vector 98 and the RANDOM FORESTS®, or random decision forest models, (e.g., collection of decision trees 96) model in a non-uniform manner. This is because the feature chosen for the split node and the remainder of nodes to be traversed on the root-to-leaf path for the decision tree 96 may be at least partially unpredictable. Such unpredictability may limit RANDOM FORESTS® models, or random decision forest models, implementations to being memory-bound, which may hamper the scalability of the RANDOM FORESTS® models, or random decision forest models.

Accordingly, in certain embodiments, it may be useful to provide enhanced techniques to generate RANDOM FORESTS® models, or random decision forest models, by converting each of the paths-to-leaves of respective decision trees 96 into feature identification chains (e.g., vertical or horizontal root to leaf path of a decision tree) based on feature values, and to make decisions based on feature ranges and/or labeling of feature ranges (e.g., as opposed to feature values). Furthermore, decisions based on RANDOM FORESTS® models, or random decision forest models, generated using such techniques may be executed by automata processors (30) using automatons implemented on the automata processors (30) with improved space efficiency (e.g., physical area). The improved space efficiency may lead to higher prediction data throughput. Moreover, the present embodiments may also provide for accurate representation of the RANDOM FORESTS® models, or random decision forest models.

Figure 10:
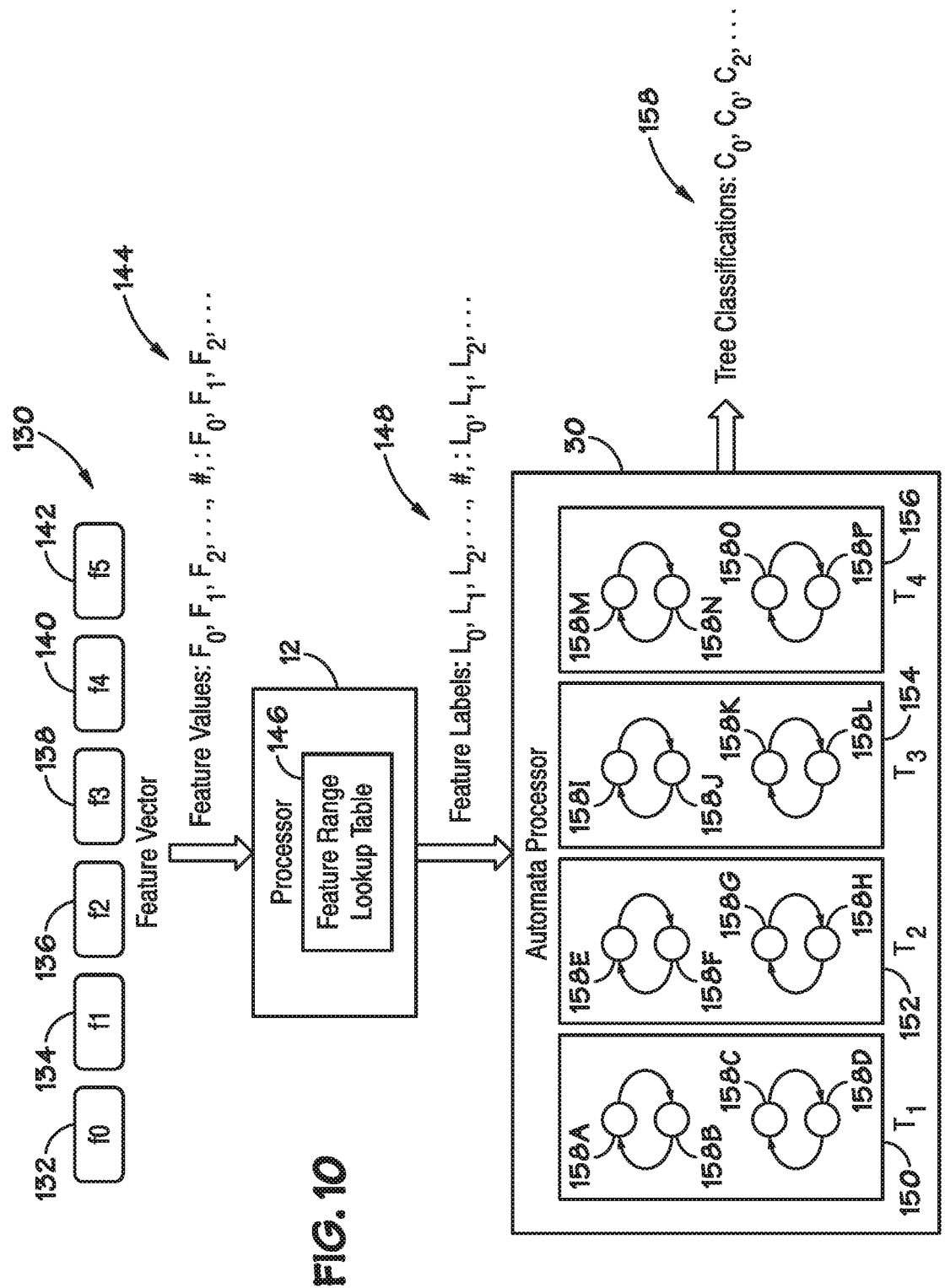
FIG. 10 illustrates a diagram of a three-stage execution pipeline including feature vectors and an automata processor used for classifying the feature vectors, in accordance with an embodiment.

For example, FIG. 10 illustrates a feature vector 130 (including a set of feature values including feature value 132 ("f0"), feature value 134 ("f1"), feature value 136 ("f2"), feature value 138 ("f3"), feature value 140 ("f4"), and feature value 142 ("f5")), a processor 12 configured to pre-process the feature vector 130 and an automata processor(s) 30 configured to classify the feature vector 130. In some embodiments, the feature vector 130 may be stored in the system memory 26. In certain embodiments, as will be further appreciated below, the decision trees (including, for example, decision tree(s) 96) in the RANDOM FORESTS® model, or random decision forest model, may be compiled, converted into a set of STEs (e.g., automata), and stored (e.g., within the system memory 26 and/or onboard of the processor 12) to be executed at run-time on the automata processor(s) 30. In certain embodiments, as illustrated with respect to FIG. 10, the classification process may include three separate stages (e.g., pipelined stages).

For example, in a first pre-processing stage, the input data to be streamed (e.g., from the processor 12) to the automata processor 30 may be generated by the processor 12 based on a feature vector 130 corresponding to the input data. The feature vector 130 may be received by the processor 12. The processor 12 may convert the feature values 144 (e.g., $F_0$, $F_1$, $F_2$, . . . , #) of the feature vector 130 into labels that may be more efficiently and accurately computed and handled by the automata processor(s) 30.

In certain embodiments, the processor 12 may form a label vector by determining which side of a threshold each corresponding feature value lies on, and assigning each interval a label. A label value is set to a first value if the feature value is less than a first threshold value, or a second value when the feature value is not less than the threshold value. Further iterations of this labeling technique would set a label value to a third value if the later feature value is greater than the later threshold value and as a fourth value when the later feature value is not greater than the later threshold value.

For example, the processor 12 may access a look-up table (LUT) 146, which may include an array of feature labels corresponding to the feature values 144 (e.g., $F_0$, $F_1$, $F_2$, . . . , #, . . . ) of an input data sample that may be concatenated to each other to form a label vector. The processor 12 may generate label vectors and/or label values 148 (e.g., $L_0$, $L_1$, $L_2$, . . . , #, . . . ) based on different input data samples, which may be concatenated to each other and denoted by the delimiter symbol "#" (e.g., although this delimiter symbol may be denoted by any of various symbols and/or characters) to form the complete input data stream.

In certain embodiments, as further illustrated in FIG. 10, an automaton corresponding to each decision tree 150 (e.g., "$T_1$"), 152 (e.g., "$T_2$"), 154 (e.g., "$T_3$"), 156 (e.g., "$T_4$") of a trained RANDOM FORESTS® model, or random decision forest model, STEs 158A-158P may be configured on the automata processor(s) 30 (e.g., by loading a binary image on the automata processor(s)) to classify the label vector using each decision tree 150 (e.g., "$T_1$"), 152 (e.g., "$T_2$"), 154 (e.g., "$T_3$"), 156 (e.g., "$T_4$") in the RANDOM FORESTS® model, or random decision forest model. An output vector of the automata processor(s) 30 identifies the classifications 159 (e.g., $C_0$, $C_1$, $C_2$, . . . , #, . . . ). The processor 12 may post-process the classifications from each decision tree 150 (e.g., "$T_1$"), 152 (e.g., "$T_2$"), 154 (e.g., "$T_3$"), 156 (e.g., "$T_4$") to generate the final classification of the input data. For example, the processor may apply, for example, a majority-consensus model (e.g., a majority voting technique) to identify a final classification of the input data.

Figure 11:
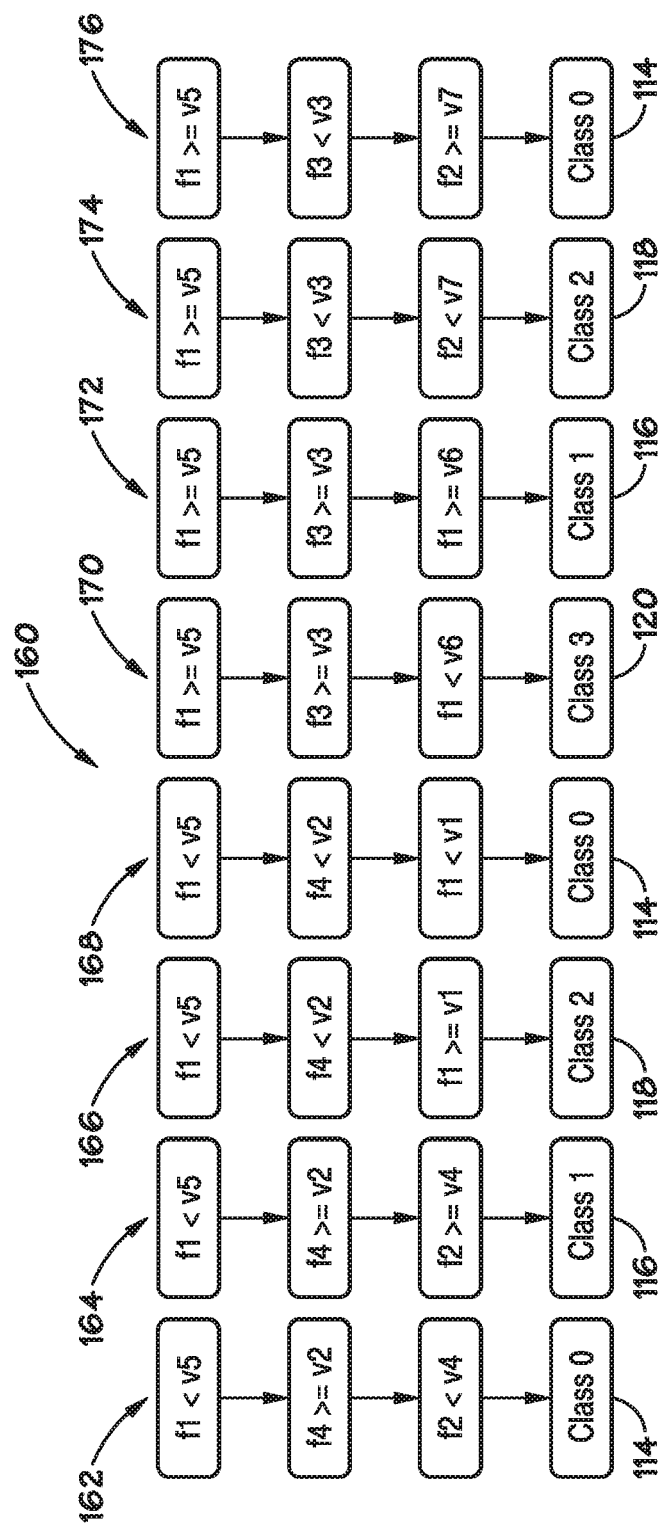
FIG. 11 illustrates another diagram of a chain of feature vectors and classifications using one or more decision trees in a RANDOM FORESTS®, or random decision forest model, in accordance with an embodiment.

In certain embodiments, as illustrated in FIG. 11, before the compiler 31 converts a decision tree (e.g., decision tree 96) into automata (e.g., STEs 158A-158P), the processor 12 may represent each root-to-leaf path of the decision tree as a chain (e.g., vertical root-to-leaf path of a decision tree), as depicted by the chain decision tree 160. Each possible path 162, 164, 166, 168, 170, 172, and 174 through the decision tree 96 may be represented as a separate chain of feature nodes (e.g., STEs 158A-158P). As previously discussed above with respect to FIG. 10, the automata processor(s) 30 may not compute decisions based on feature values, but rather the automata processor(s) 30 may compute decisions based on feature ranges and/or feature range labels.

For example, a feature range may include a range of values between two "cuts" in a decision tree of the same feature. Each node in paths 162, 164, 166, 168, 170, 172, and 174 may present a mathematical comparison to be performed. The value with which the comparison is performed for the feature may be referred to as a "cut" (e.g., a cutoff value) for a range. It then follows that the feature values less than or equal to the "cut" value is the range for the feature values. FIG. 11 illustrates the possible "cut" values (e.g., as illustrated by values "v1-v7") and feature ranges for features f0, f1, f2, f3, and f4. It should be appreciated that values greater than a "cut" value may constitute a different range. As further depicted in FIG. 11, the processor 12 may compute operations with respect to the features f0, f1, f2, f3, and f4 being out of sequential order (e.g., paths of decision trees 162, 164, 166, 168, 170, 172, and 174 out of sequential order following a vertical path such as f1, f4, f2 as opposed to f1, f2, f4 in sequential order).

Figure 12:
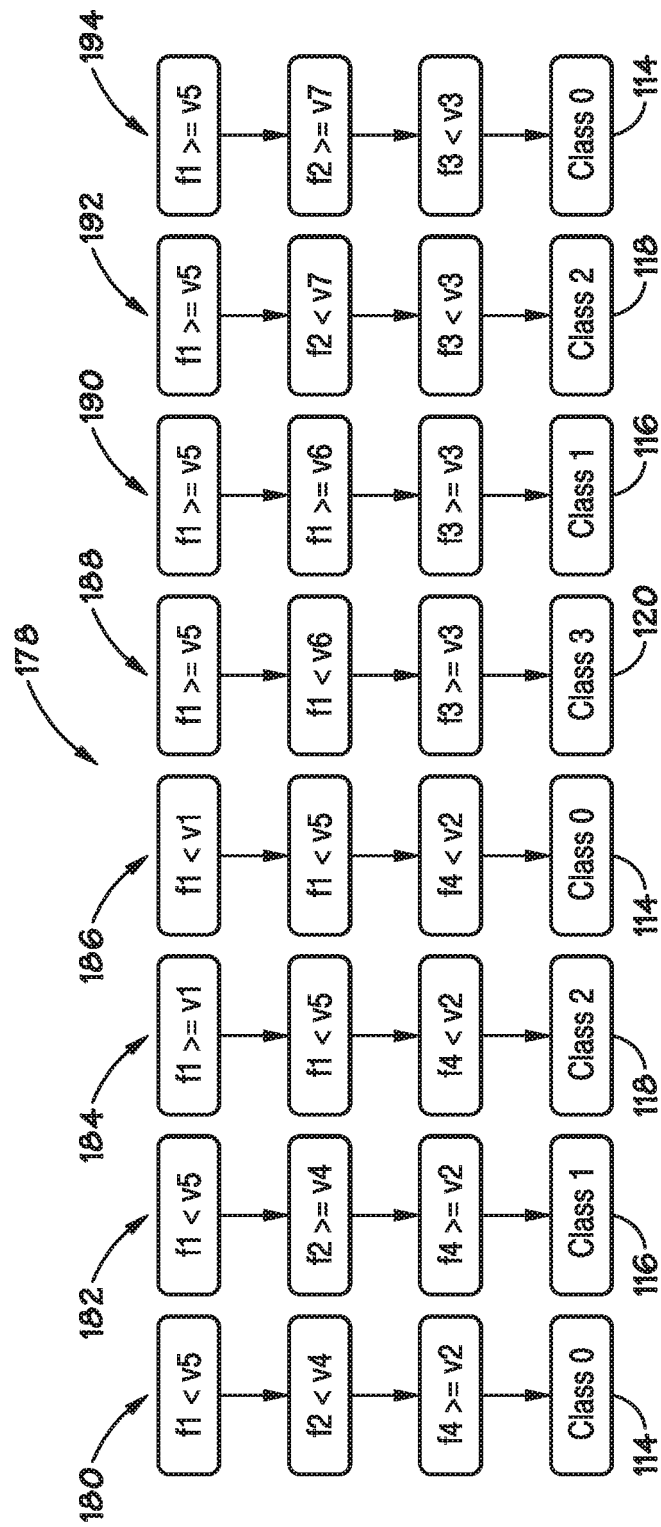
FIG. 12 illustrates a diagram of a reordered chain of feature vectors and classifications using one or more decision trees in a RANDOM FORESTS®, or random decision forest model, in accordance with an embodiment.

However, in certain embodiments, as illustrated by reordered chain decision tree 178 in FIG. 12, it may be useful for the processor 12 to reorder the chains 162, 164, 166, 168, 170, 172, and 174 such that all like features are aligned within the chains 162, 164, 166, 168, 170, 172, and 174 in a sequential order. For example, as illustrated in FIG. 12, each of the reordered chains 180, 182, 184, 186, 188, 190, 194, and 192 are reordered to be in sequential order (e.g., f1, f2, f4; f1, f1, f4; f1, f1, f3; f1, f2, f3; and so forth, as opposed to f1, f4, f2; f1, f4, f1; f1, f3, f1; and so forth illustrated in FIG. 11).

Figure 13:
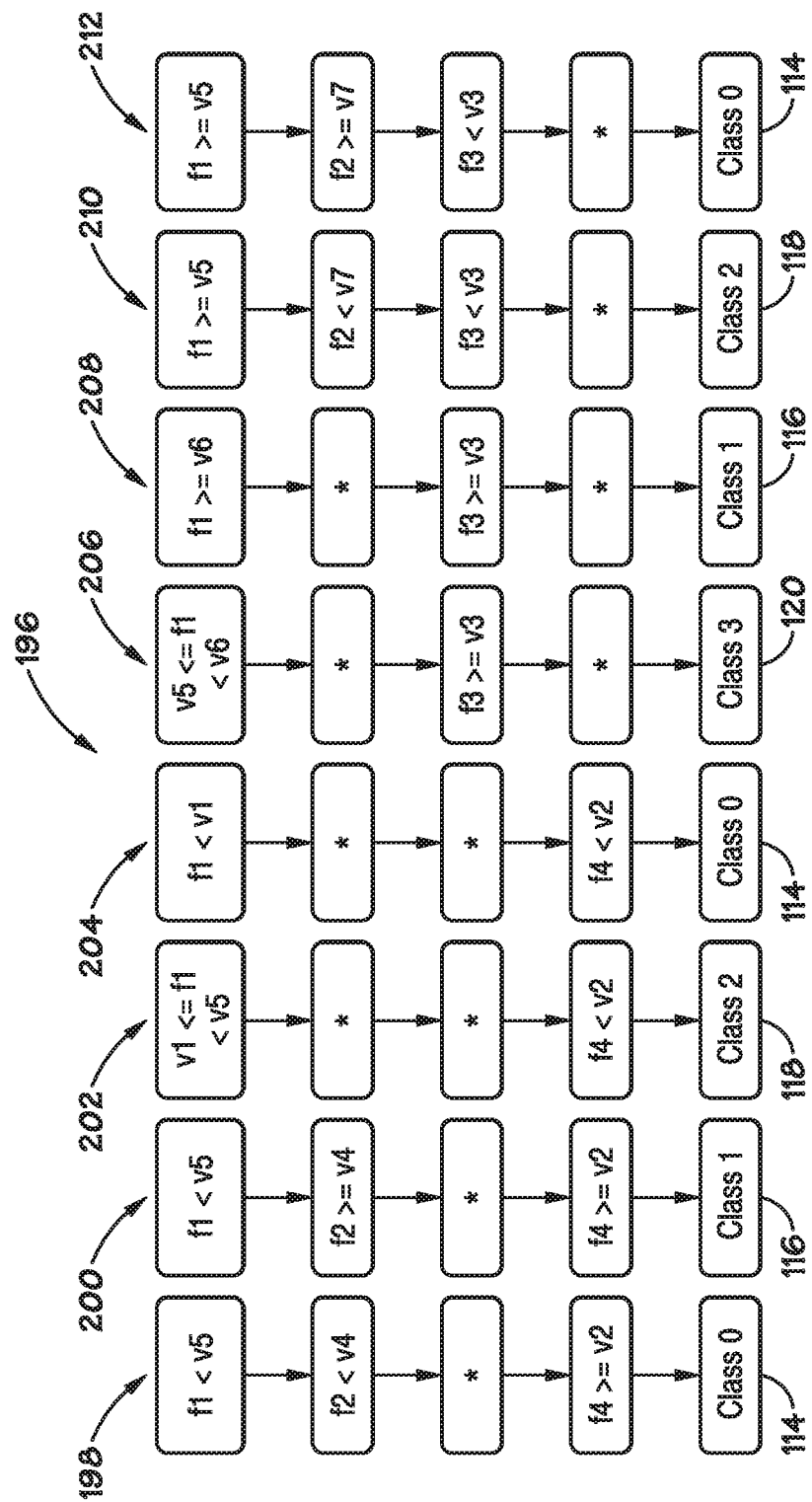
FIG. 13 illustrates a diagram of a complete chain of feature vectors and classifications using one or more decision trees in a RANDOM FORESTS®, or random decision forest model, in accordance with an embodiment.

FIG. 13 illustrates decision tree 196, which includes chains 198, 200, 202, 204, 206, 208, 210, and 212 similar to that discussed with respect to FIGS. 11 and 12 including a number of "Don't Care" nodes, as denoted by the "*" symbol. In operation, the chains 198, 200, 202, 204, 206, 208, 210, and 212 may be filled with "Don't Care" nodes to accept all input feature values in sequential order, such that feature values may be streamed into the automata processor(s) 30 one-by-one in sequential order. By reordering and filling the chains 198, 200, 202, 204, 206, 208, 210, and 212 with "Don't Care" nodes, the automata processor(s) 30 may execute (e.g., at runtime) all chains 198, 200, 202, 204, 206, 208, 210, and 212 of a decision tree(s) in parallel by utilizing one or more Boolean AND functions.

Figure 14:
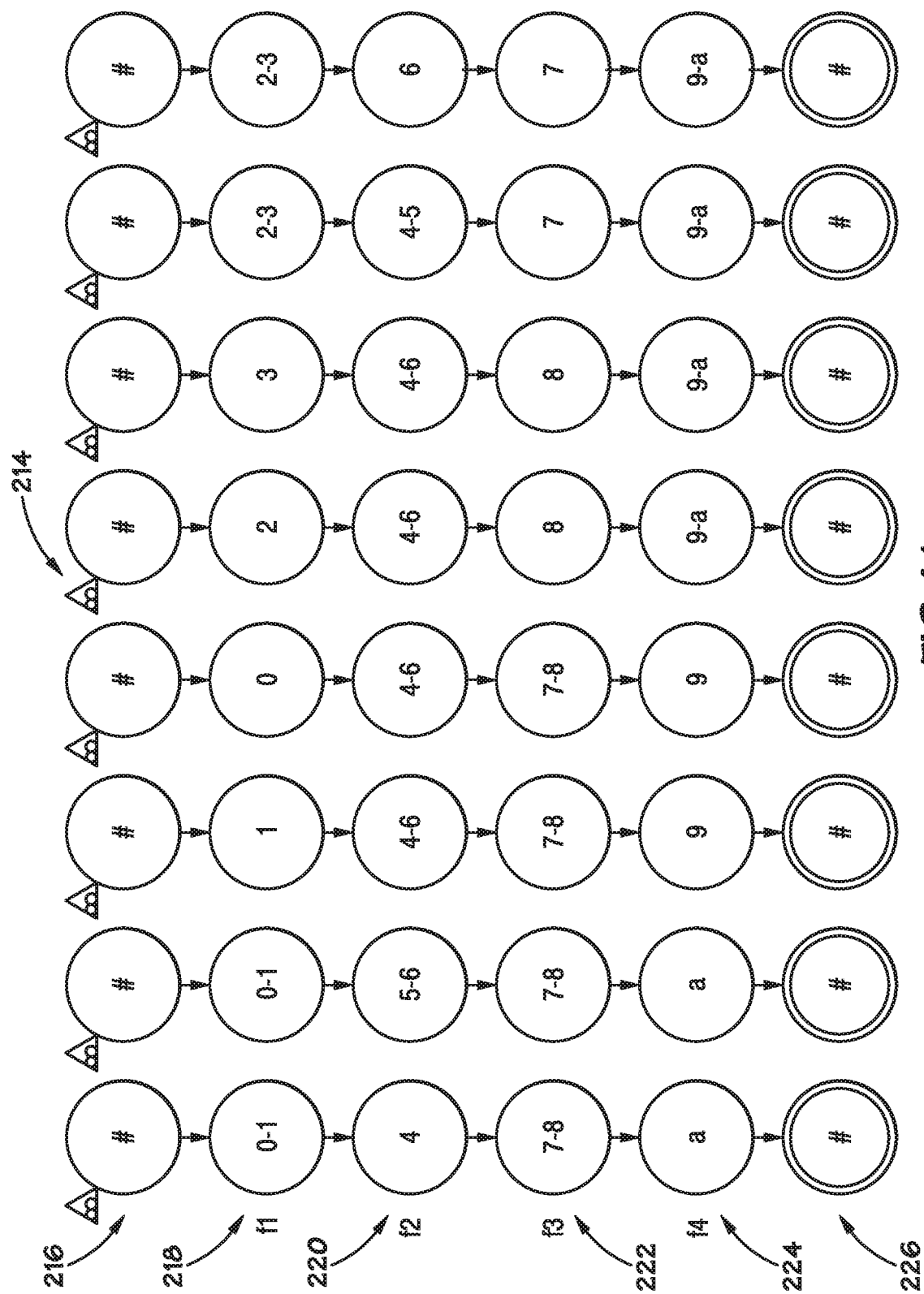
FIG. 14 illustrates a diagram of STEs of the automata processor used to implement a RANDOM FORESTS® model, or random decision forest model, in accordance with an embodiment.
Figure 15:
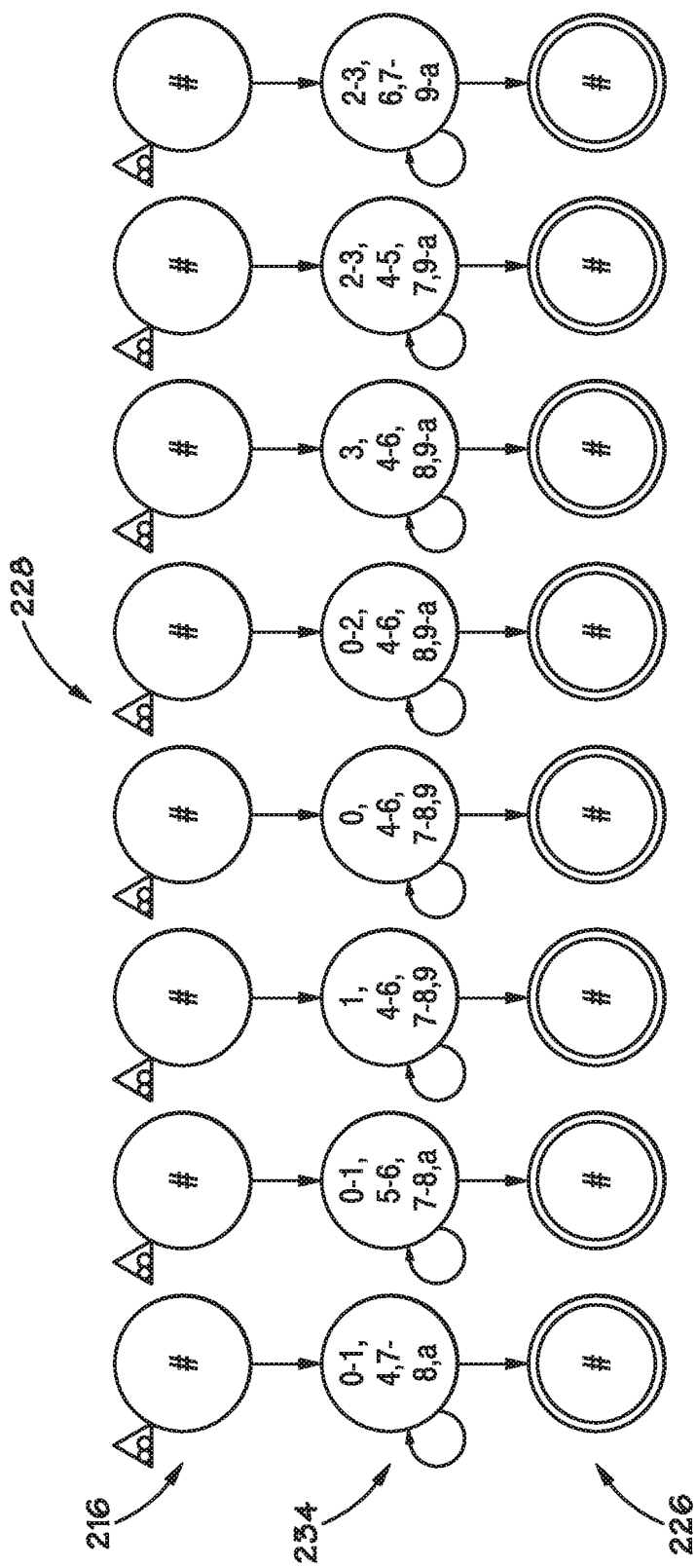
FIG. 15 illustrates a diagram of a space-efficient implementation of the RANDOM FORESTS® model, or random decision forest model, of FIG. 14, in accordance with an embodiment.

FIGS. 14 and 15 illustrate a complete decision tree 214 and a resultant example of the presently disclosed space-efficient (e.g., area efficient) RANDOM FORESTS® model, or random decision forest model, techniques utilized to reduce the number of STEs utilized to represent the features f0, f1, f2, f3, and f4 and/or decisions based on the features f0, f1, f2, f3, and f4. For example, FIG. 14 illustrates a part of a complete decision tree 214, which includes chains of the decision tree, label STEs 216 and 226 corresponding to the feature values of different input data samples concatenated with each other to form a label vector (e.g., delimited by the symbol "#"), and features 218 (e.g., f1), features 220 (e.g., f2), features 222 (e.g., f3), and features 224 (e.g., f4). As further illustrated by FIG. 14, the individual feature range values may be indicated by the alphanumerical values and/or ranges (e.g., "0-1", "1", "0" "2", "3", "2-3", . . . , "a", "9", "9-a").

In certain embodiments, as previously noted above with respect to FIG. 14, it may be useful to conserve space and/or area on the automata processor(s) 30 by reducing the number of STEs utilized to represent the features f0, f1, f2, f3, and f4 and/or decisions based on the features f0, f1, f2, f3, and f4. For example, as depicted by the space-efficient decision tree 228 of FIG. 15, a space compression technique may be utilized to reduce the number of STEs required to represent the features f0, f1, f2, f3, and f4. For example, in certain embodiments, the space compression technique may include an Automata Folding (e.g., folding chain of decision trees into an executable loop) technique used to effectively combine features into a single STE. In certain embodiments, Automata Folding may be performed by utilizing the following optimization equation:

$$\min n : \forall i \in [1, n], \sum_{j=0}^{\lfloor m/n \rfloor} f_{nj+i} \leq C \quad (1)$$

In the above equation, n is the number of STEs used in the automaton, i is the index of the current STE, $f_{nj+i}$ is the number of intervals assigned to feature nj+i, m is the total number of features, and C is the capacity of the STE. The optimization function may return the minimum number of STEs required to represent m features, in which the individual STEs may be chained to form a loop.

For example, in a simple case in which two STEs are required, the first STE may check feature f1. The second STE in this example may then then check feature f2. As the iterations progress, the first STE may check feature f3, while the second STE may check feature f4, and so on. Since the total number of labels for all of the features may be less than, for example, 256 in some embodiments, only a single STE may be utilized to check the labels of all of the features f0, f1, f2, f3, and f4, and so forth. The single STE may check the first symbol of the label vector against the possible labels for feature f1. If a match occurs, the single STE may then activate itself to check the second symbol in the label vector against the possible labels for feature f2, and so on. In this way, the size and area of the individual decision trees may be markedly reduced, and, by extension, the size and area of the decision tree 228 may be reduced (e.g., as compared to the complete decision tree 214 of FIG. 14).

While the invention may be susceptible to various modifications and alternative forms, specific embodiments have been illustrated by way of example in the drawings and have been described in detail herein. However, it should be understood that the invention may be not intended to be limited to the particular forms disclosed. Rather, the invention may be to cover all modifications, equivalents, and alternatives falling within the spirit and scope of the invention as defined by the following appended claims.

The techniques presented and claimed herein are referenced and applied to material objects and concrete examples of a practical nature that demonstrably improve the present technical field and, as such, are not abstract, intangible or purely theoretical. Further, if any claims appended to the end of this specification contain one or more elements designated as "means for [perform]ing [a function] . . . " or "step for [perform]ing [a function] . . . ", it is intended that such elements are to be interpreted under 35 U.S.C. 112(f). However, for any claims containing elements designated in any other manner, it is intended that such elements are not to be interpreted under 35 U.S.C. 112(f).

What is claimed is:

1. An apparatus, comprising:
    a first processing resource configured to:
        receive a feature vector of a data stream, wherein the feature vector comprises a sequence of feature values that are each indicated as a floating point value;
        determine one or more decision trees in accordance with which the data stream is to be classified, wherein the one or more decision trees comprises a first node configured to determine whether a first feature value included in the feature vector is less than a first threshold value; and
        determine a label vector comprising a sequence of feature labels that each corresponds with a different feature value included in the feature vector at least in part by setting a first feature label corresponding with the first feature value as a first value when the first feature value is less than the first threshold value and as a second value when the first feature value is not less than the first threshold value; and a second processing resource comprising a state transition element configured to classify the data stream at least in part by determining whether the first feature value in the feature vector matches the first value, wherein the state transition element comprises a plurality of memory cells and logic circuitry.

2. The apparatus of claim 1, wherein:
the one or more decision trees comprises a second node configured to determine whether a second feature value included in the feature vector is greater than a second threshold value;
the first processing resource is configured to determine the label vector at least in part by setting a second feature label corresponding with the second feature value as a third value when the second feature value is greater than the second threshold value and as a fourth value when the second feature value is not greater than the second threshold value; and
the state transition element of the second processing resource is configured to classify the data stream at least in part by determining whether the second feature value in the feature vector matches the third value.

3. The apparatus of claim 2, wherein:
the first processing resource is configured to:
determine an initial decision chain corresponding with a root-to-leaf path through the one or more decision trees, wherein the initial decision chain comprises the first node configured to determine whether the first feature value is less than the first threshold value and the second node configured to determine whether the second feature value is greater than the second threshold value;
determine an adjusted decision chain at least in part by:
replacing the first node in the initial decision chain with a first label node configured to determine whether the first feature value included in the feature vector matches the first value; and
replacing the second node in the initial decision chain with a second label node configured to determine whether the second feature value included in the feature vector matches the third value; and
fold the adjusted decision chain into a decision loop; and
the state transition element of the second processing resource is configured to execute the decision loop to classify the data stream at least in part by:
executing the first label node configured to determine whether the first feature value matches the first value; and
after executing the first label node configured to determine whether the first feature value matches the first value, executing the second label node configured to determine whether the second feature value included in the feature vector matches the third value.

4. A method, comprising:
receiving a feature vector of a data stream at a first processing resource, wherein the feature vector comprises a sequence of feature values that is each indicated as a floating point value;
determining, using the first processing resource, one or more decision trees in accordance with which the data stream is to be classified, wherein the one or more decision trees comprises a first node that determines whether a first feature value included in the feature vector is greater than a first threshold value;
determining, using the first processing resource, a label vector comprising a sequence of feature labels that each corresponds with a different feature value included in the feature vector, wherein determining the label vector comprises setting a first feature label corresponding with the first feature value as a first value when the first feature value is greater than the first threshold value and as a second value when the first feature value is no greater than the first threshold value; and
outputting, using the first processing resource, the label vector to enable a state transition element implemented in a second processing resource to classify the data stream at least in part by determining whether the first feature value in the feature vector matches the first value.

5. The method of claim 4, wherein:
the one or more decision trees comprises a second node that determines whether a second feature value included in the feature vector is less than a second threshold value;
determining the label vector comprises setting a second feature label corresponding with the second feature value as a third value when the second feature value is less than the second threshold value and as a fourth value when the second feature value is not less than the second threshold value; and
outputting the label vector comprises outputting the second feature label to enable the state transition element implemented in the second processing resource to classify the data stream at least in part by determining whether the second feature value in the feature vector matches the third value.

6. The method of claim 5, further comprising:
determining, using the first processing resource, an initial decision chain corresponding with a root-to-leaf path through the one or more decision trees, wherein the initial decision chain comprises the first node that determines whether the first feature value is greater than the first threshold value and the second node that determines whether the second feature value is less than the second threshold value;
determining, using the first processing resource, an adjusted decision chain at least in part by:
replacing the first node in the initial decision chain with a first label node that determines whether the first feature value included in the feature vector matches the first value; and
replacing the second node in the initial decision chain with a second label node that determines whether the second feature value included in the feature vector matches the third value; and
folding, using the first processing resource, the adjusted decision chain into a decision loop; and
outputting, using the first processing resource, the decision loop to enable the state transition element implemented in the second processing resource to classify the data stream at least in part by:
executing the first label node that determines whether the first feature value matches the first value; and
after executing the first label node that determines whether the first feature value matches the first value, executing the second label node that determines whether the second feature value included in the feature vector matches the third value.

7. A tangible, non-transitory, computer-readable medium storing instructions executable by one or more host processors, wherein the instructions comprise instructions to:
receive, using the one or more host processors, a feature vector of a data stream, wherein the feature vector comprises a sequence of feature values that is each indicated as a floating point value;

determine, using the one or more host processors, one or more decision trees in accordance with which the data stream is to be classified, wherein the one or more decision trees comprises a first node that determines whether a first feature value included in the feature vector is less than a first threshold value;

determine, using the one or more host processors, a label vector comprising a sequence of feature labels that each corresponds with a different feature value included in the feature vector, wherein the instructions to determine the label vector comprise instructions to set a first feature label corresponding with the first feature value as a first value when the first feature value is less than the first threshold value and as a second value when the first feature value is not less than the first threshold value; and output, using the one or more host processors, the label vector to enable a state transition element implemented in an automata processor to classify the data stream at least in part by determining whether the first feature value in the feature vector matches the first value.

8. The tangible, non-transitory, computer-readable medium of claim 7, wherein:

the one or more decision trees comprises a second node that determines whether a second feature value included in the feature vector is less than a second threshold value;

the instructions to determine the label vector comprise instructions to set a second feature label corresponding with the second feature value as a third value when the second feature value is less than the second threshold value and as a fourth value when the second feature value is not less than the second threshold value; and the instructions to output the label vector comprise instructions to output the second feature label to enable the state transition element implemented in the automata processor to classify the data stream at least in part by determining whether the second feature value in the feature vector matches the third value.

9. The tangible, non-transitory, computer-readable medium of claim 8, further comprising instructions to:

determine, using the one or more host processors, an initial decision chain corresponding with a root-to-leaf path through the one or more decision trees, wherein the initial decision chain comprises the first node that determines whether the first feature value is less than the first threshold value and the second node that determines whether the second feature value is less than the second threshold value;

determine, using the one or more host processors, an adjusted decision chain at least in part by:
replacing the first node in the initial decision chain with a first label node that determines whether the first feature value included in the feature vector matches the first value; and
replacing the second node in the initial decision chain with a second label node that determines whether the second feature value included in the feature vector matches the third value;

fold, using the one or more host processors, the adjusted decision chain into a decision loop; and output, using the one or more host processors, the decision loop to enable the state transition element implemented in the automata processor to classify the data stream at least in part by:

executing the first label node that determines whether the first feature value matches the first value; and after executing the first label node that determines whether the first feature value matches the first value, executing the second label node that determines whether the second feature value included in the feature vector matches the third value.

10. An apparatus, comprising:

a first processing resource configured to:
determine a random decision forest model in accordance with which a data stream is to be classified, wherein the random decision forest model comprises a plurality of decision trees that includes a first node configured to determine whether a first feature value included in a feature vector of the data stream is greater than a first threshold value; and
determine a label vector comprising a sequence of feature labels that each corresponds with a different feature value included in the feature vector of the data stream at least in part by setting a first feature label corresponding with the first feature value as a first value when the first feature value is greater than the first threshold value and as a second value when the first feature value is not greater than the first threshold value; and a second processing resource communicatively coupled to the first processing resource, wherein the second processing resource comprises a state transition element configured to determine whether the first feature value in the feature vector matches the first value to classify the data stream.

11. The apparatus of claim 10, wherein:

the plurality of decision trees of the random decision forest model comprises a second node configured to determine whether a second feature value included in the feature vector is less than a second threshold value;

the first processing resource is configured to determine the label vector at least in part by setting a second feature label corresponding with the second feature value as a third value when the second feature value is less than the second threshold value and as a fourth value when the second feature value is not less than the second threshold value; and the state transition element of the second processing resource is configured to determine whether the second feature value in the feature vector matches the third value to classify the data stream.

12. The apparatus of claim 10, wherein:

the feature vector of the data stream comprises a sequence of feature values;

the first processing resource is configured to:

determine an initial decision chain corresponding with a root-to-leaf path through the plurality of decision trees of the random decision forest model, wherein the initial decision chain comprises the first node configured to determine whether the first feature value included in the feature vector of the data stream is greater than the first threshold value; and determine an adjusted decision chain corresponding with root-to-leaf path through the plurality of decision trees of the random decision forest model at least in part by:
reordering a node sequence in accordance with a sequence order of the feature values in the feature vector when the node sequence of the initial decision chain differs from the sequence order of the feature values in the feature vector;

inserting a "Don't Care" node corresponding with a second feature value included in the feature vector when the initial decision chain does not include a second node configured to compare the second feature value against a second threshold value; and
replacing the first node in the initial decision chain with a label node configured to determine whether the first feature value included in the feature vector matches the first value; and
fold the adjusted decision chain into a decision loop; and
the state transition element of the second processing resource is configured to execute the decision loop to classify the data stream at least in part by executing the label node configured to determine whether the first feature value in the feature vector matches the first value.

13. The apparatus of claim 12, wherein:
the feature vector comprises the first feature value followed by the second feature value;
the root-to-leaf path through the plurality of decision trees of the random decision forest model comprises the second node configured to evaluate the second feature value in the feature vector followed by the first node configured to evaluate the first feature value in the feature vector; and
the first processing resource is configured to determine the adjusted decision chain at least in part by reordering the initial decision chain such that the first node configured to evaluate the first feature value precedes the second node configured to evaluate the second feature value.

14. The apparatus of claim 12, wherein:
the feature vector comprises the first feature value and the second feature value;
the root-to-leaf path through the plurality of decision trees of the random decision forest model comprises the first node configured to evaluate the first feature value in the feature vector, but not the second node configured to evaluate the second feature value in the feature vector; and
the first processing resource is configured to determine the adjusted decision chain at least in part by inserting the "Don't Care" node to evaluate the second feature value in the feature vector.

15. The apparatus of claim 10, wherein:
the first processing resource comprises one or more host processors;
the second processing resource comprises an automata processor; and
the state transition element comprises a plurality of memory cells and logic circuitry.

16. The apparatus of claim 10, further comprising a compiler configured to program the state transition element of the second processing resource to check whether the first feature value included in the feature vector matches the first value.

17. A method, comprising:
determining, via a first processing resource, a random decision forest model in accordance with which a data stream is to be classified by a second processing resource, wherein the random decision forest model comprises a plurality of decision trees that include a first node configured to determine whether a first feature value included in a feature vector of the data stream is less than a first threshold value;
determining, via the first processing resource, a label vector comprising a sequence of feature labels that each corresponds with a different feature value included in the feature vector of the data stream at least in part by setting a first feature label corresponding with the first feature value as a first value when the first feature value is less than the first threshold value and as a second value when the first feature value is not less than the first threshold value; and
outputting, via the first processing resource, the label vector to enable a state transition element implemented in the second processing resource to classify the data stream at least in part by determining whether the first feature value in the feature vector matches the first value.

18. The method of claim 17, wherein:
the plurality of decision trees of the random decision forest model comprises a second node configured to determine whether a second feature value included in the feature vector is greater than a second threshold value;
determining the label vector comprises setting a second feature label corresponding with the second feature value as a third value when the second feature value is greater than the second threshold value and as a fourth value when the second feature value is not greater than the second threshold value; and
outputting the label vector comprises outputting the second feature label to enable the state transition element implemented in the second processing resource to classify the data stream at least in part by determining whether the second feature value in the feature vector matches the third value.

19. The method of claim 18, further comprising:
determining, via the first processing resource, an initial decision chain corresponding with a root-to-leaf path through the plurality of decision trees of the random decision forest model, wherein the initial decision chain comprises the first node that determines whether the first feature value is less than the first threshold value and the second node that determines whether the second feature value is greater than the second threshold value;
determining, via the first processing resource, an adjusted decision chain at least in part by:
replacing the first node in the initial decision chain with a first label node that determines whether the first feature value included in the feature vector matches the first value; and
replacing the second node in the initial decision chain with a second label node that determines whether the second feature value included in the feature vector matches the third value; and
fold, via the first processing resource, the adjusted decision chain into a decision loop; and
outputting, via the first processing resource, the decision loop to enable subsequent execution by the state transition element implemented in the second processing resource.

20. The method of claim 19, further comprising:
instructing, via the first processing resource, the state transition element implemented in the second processing resource to execute the first label node that determines whether the first feature value matches the first value; and
after instructing, via the first processing resource, the state transition element implemented in the second processing resource to execute the first label node that determines whether the first feature value matches the first value, instructing, via the first processing resource, the state transition element implemented in the second processing resource to execute the first label node that determines whether the second feature value matches the third value.

21. An apparatus, comprising:
an automata processor configured to classify a data stream, wherein the data stream comprises a feature vector and the automata processor comprises a plurality of state transition elements; and
one or more host processors configured to:
   determine one or more decision trees in accordance with which the data stream is to be classified, wherein the one or more decision trees comprise a first node configured to determine whether a first feature value included in the feature vector of the data stream is greater than a first threshold value;
   determine a label vector comprising a sequence of feature labels that each corresponds with a different feature value included in the feature vector of the data stream at least in part by setting a first feature label corresponding with the first feature value as a first value when the first feature value is greater than the first threshold value and as a second value when the first feature value is not greater than the first threshold value; and
   determine a plurality of decision loops each corresponding with a different root-to-leaf path through the one or more decision trees, wherein:
      each of the plurality of decision loops is configured to be executed by a single state transition element in the automata processor; and
      the automata processor is configured to execute the plurality of decision loops in parallel at least in part by determining whether the first feature value in the feature vector matches the first value.

22. The apparatus of claim 21, wherein:
the plurality of decision loops comprises a first decision loop corresponding with a first root-to-leaf path through the one or more decision trees and a second decision loop corresponding with a second root-to-leaf path through the one or more decision trees; and
the plurality of state transition elements comprises:
   a first state transition element configured to execute the first decision loop, wherein the first state transition element comprises a first plurality of memory cells and first logic circuitry; and
   a second state transition element configured to execute the second decision loop while the first decision loop is concurrently being executed by the first state transition element, wherein the second state transition element comprises a second plurality of memory cells and second logic circuitry.

23. The apparatus of claim 21, wherein:
the one or more decision trees comprise a second node configured to determine whether a second feature value included in the feature vector of the data stream is greater than a second threshold value;
the one or more host processors are configured to determine the label vector at least in part by setting a second feature label corresponding with the second feature value as a third value when the second feature value is greater than the second threshold value and as a fourth value when the second feature value is not greater than corresponding the second threshold value; and the automata processor is configured to execute the plurality of decision loops at least in part by determining whether the second feature value in the feature vector matches the third value.

24. The apparatus of claim 21, wherein the one or more host processors are configured to:
determine a plurality of decision chains each corresponding with a different root-to-leaf path through the one or more decision trees at least in part by:
   determining an initial decision chain corresponding with a root-to-leaf path through the one or more decision trees, wherein the initial decision chain comprises the first node configured to determine whether the first feature value included in the feature vector of the data stream is greater than the first threshold value; and
   determining an adjusted decision chain corresponding with the root-to-leaf path through the one or more decision trees at least in part by replacing the first node configured to determine whether the first feature value included in the feature vector of the data stream is greater than the first threshold value in the initial decision chain with a label node configured to determine whether the first feature value in the feature vector matches the first value; and
determine the plurality of decision loops at least in part by folding each of the plurality of decision chains.

25. The apparatus of claim 24, wherein:
the feature vector comprises a sequence of feature values; and
the one or more host processors are configured to determine the adjusted decision chain corresponding with the root-to-leaf path through the one or more decision trees at least in part by:
   reordering a node sequence in accordance with a sequence order of the feature values in the feature vector when the node sequence of the initial decision chain differs from the sequence order of the feature values in the feature vector; and
   inserting a "Don't Care" node corresponding with a second feature value included in the feature vector when the initial decision chain does not include a second node configured to compare the second feature value against a second threshold value.

26. A method, comprising:
determining, using one or more host processors, one or more decision trees in accordance with which a data stream is to be classified, wherein the one or more decision trees comprise a first node that determines whether a first feature value included in a feature vector of the data stream is less than a first threshold value;
determining, using the one or more host processors, a label vector comprising a sequence of feature labels that each corresponds with a different feature value included in the feature vector of the data stream at least in part by setting a first feature label corresponding with the first feature value as a first value when the first feature value is less than the first threshold value and as a second value when the first feature value is not less than the first threshold value;
determining, using the one or more host processors, a plurality of decision loops each corresponding with a different root-to-leaf path through the one or more decision trees; and
outputting, using the one or more host processors, the label vector and the plurality of decision loops to enable an automata processor to execute the plurality of decision loops in parallel at least in part by determining whether the first feature value in the feature vector matches the first value.

27. The method of claim 26, further comprising:
instructing, using the one or more host processors, a first state transition element implemented in the automata processor to execute a first decision loop of the plurality of decision loops, wherein the first state transition element comprises a first plurality of memory cells and first logic circuitry; and
instructing, using the one or more host processors, a second state transition element implemented in the automata processor to execute a second decision loop of the plurality of decision loops while the first decision loop is concurrently being executed by the first state transition element, wherein the second state transition element comprises a second plurality of memory cells and second logic circuitry.

28. The method of claim 26, wherein:
the one or more decision trees comprise a second node configured to determine whether a second feature value included in the feature vector of the data stream is less than a second threshold value;
determining the label vector comprises setting a second feature label corresponding with the second feature value as a third value when the second feature value is less than the second threshold value and as a fourth value when the second feature value is not less than the second threshold value; and
outputting the label vector comprises outputting the second feature label to enable the automata processor to execute the plurality of decision loops at least in part by determining whether the second feature value in the feature vector matches the third value.

29. The method of claim 26, comprising determining, using the one or more host processors, a plurality of decision chains each corresponding with a different root-to-leaf path through the one or more decision trees, wherein:
determining the plurality of decision chains comprises:
determining an initial decision chain corresponding with a root-to-leaf path through the one or more decision trees, wherein the initial decision chain comprises the first node configured to determine whether the first feature value included in the feature vector of the data stream is greater than the first threshold value; and
determining an adjusted decision chain corresponding with the root-to-leaf path through the one or more decision trees at least in part by replacing the first node configured to determine whether the first feature value included in the feature vector of the data stream is greater than the first threshold value in the initial decision chain with a label node configured to determine whether the first feature value in the feature vector matches the first value; and
determining the plurality of decision loops comprises folding each of the plurality of decision chains.

* * * * *